United States Patent
Lundberg

(10) Patent No.: US 10,295,826 B2
(45) Date of Patent: May 21, 2019

(54) SHAPE RECOGNITION DEVICE, SHAPE RECOGNITION PROGRAM, AND SHAPE RECOGNITION METHOD

(71) Applicant: BRILLIANTSERVICE CO., LTD, Kita-ku, Osaka-shi, Osaka (JP)

(72) Inventor: Johannes Lundberg, Tokyo (JP)

(73) Assignee: MIRAMA SERVICE INC., New Castle, DE (US)

( * ) Notice: Subject to any disclaimer, the term of this patent is extended or adjusted under 35 U.S.C. 154(b) by 212 days.

(21) Appl. No.: 14/768,479

(22) PCT Filed: Feb. 19, 2013

(86) PCT No.: PCT/JP2013/000909
§ 371 (c)(1),
(2) Date: Aug. 18, 2015

(87) PCT Pub. No.: WO2014/128749
PCT Pub. Date: Aug. 28, 2014

(65) Prior Publication Data
US 2015/0370321 A1 Dec. 24, 2015

(51) Int. Cl.
*G02B 27/01* (2006.01)
*G06K 9/00* (2006.01)
(Continued)

(52) U.S. Cl.
CPC ............ *G02B 27/017* (2013.01); *G06F 3/011* (2013.01); *G06F 3/017* (2013.01); *G06F 3/03* (2013.01);
(Continued)

(58) Field of Classification Search
None
See application file for complete search history.

(56) References Cited

U.S. PATENT DOCUMENTS 6,002,808 A * 12/1999 Freeman ................. G06F 3/017
  348/171
6,346,929 B1 2/2002 Fukushima et al.
(Continued)

FOREIGN PATENT DOCUMENTS

JP 08-6708 1/1996
JP 08-31140 3/1996
(Continued)

OTHER PUBLICATIONS

Li, Yi. "Multi-scenario gesture recognition using Kinect." Computer Games (CGAMES), 2012 17th International Conference on. IEEE, 2012. 6 pages.*

(Continued)

*Primary Examiner* — Ryan P Potts
(74) *Attorney, Agent, or Firm* — Amin, Turocy & Watson LLP

(57) ABSTRACT

A shape recognition device, a shape recognition program, and a shape recognition method that can obtain more precise information for recognizing an external shape of an object are provided. A shape recognition device of the present invention includes an external-shape detecting unit that detects an external shape of an object, a first extracting unit that extracts a first feature point on the external shape based on the external shape detected by the external-shape detecting unit, and a second extracting unit that extracts a second feature point that exists on the external shape or in the external shape and differs from the first feature point. As a result, more precise information for recognizing the external shape of the object can be obtained.

20 Claims, 33 Drawing Sheets

(51) Int. Cl.
| | |
|---|---|
| *G06K 9/48* | (2006.01) |
| *G06F 3/01* | (2006.01) |
| *G06F 3/03* | (2006.01) |
| *G06F 3/048* | (2013.01) |
| *G06K 9/46* | (2006.01) |
| *G06F 3/0484* | (2013.01) |
| *G06T 19/00* | (2011.01) |
| *G06T 7/20* | (2017.01) |
| *G06F 3/0482* | (2013.01) |
| *H04N 13/395* | (2018.01) |
| *H04N 13/332* | (2018.01) |

(52) U.S. Cl.
CPC ............ *G06F 3/0304* (2013.01); *G06F 3/048* (2013.01); *G06F 3/0482* (2013.01); *G06F 3/04842* (2013.01); *G06F 3/04845* (2013.01); *G06K 9/00355* (2013.01); *G06K 9/00375* (2013.01); *G06K 9/00382* (2013.01); *G06K 9/00389* (2013.01); *G06K 9/4609* (2013.01); *G06K 9/48* (2013.01); *G06T 7/20* (2013.01); *G06T 19/006* (2013.01); *H04N 13/395* (2018.05); *G02B 2027/014* (2013.01); *G02B 2027/0138* (2013.01); *G02B 2027/0178* (2013.01); *G06T 2200/04* (2013.01); *G06T 2207/10004* (2013.01); *G06T 2207/20228* (2013.01); *G06T 2207/30196* (2013.01); *G06T 2210/56* (2013.01); *H04N 13/332* (2018.05)

(56) References Cited

U.S. PATENT DOCUMENTS

| | | | |
|---|---|---|---|
| 2004/0066555 A1 | 4/2004 | Nomura | |
| 2009/0110292 A1* | 4/2009 | Fujimura | G06F 3/017 382/203 |
| 2010/0278384 A1* | 11/2010 | Shotton | G06K 9/00369 382/103 |
| 2011/0018803 A1* | 1/2011 | Underkoffler | G06F 3/017 345/158 |
| 2011/0302535 A1* | 12/2011 | Clerc | G06F 3/017 715/848 |
| 2012/0075168 A1* | 3/2012 | Osterhout | G02B 27/017 345/8 |
| 2012/0133580 A1* | 5/2012 | Kirby | G06F 3/017 345/156 |
| 2012/0249741 A1* | 10/2012 | Maciocci | G06F 3/011 348/46 |
| 2012/0308140 A1* | 12/2012 | Ambrus | G06K 9/00362 382/190 |
| 2013/0141421 A1* | 6/2013 | Mount | H04N 21/41407 345/419 |
| 2013/0257748 A1* | 10/2013 | Ambrus | G02B 27/0093 345/173 |
| 2013/0265220 A1* | 10/2013 | Fleischmann | G06F 3/011 345/156 |
| 2014/0225918 A1* | 8/2014 | Mittal | G06F 3/017 345/633 |

FOREIGN PATENT DOCUMENTS

| | | |
|---|---|---|
| JP | 2003-346162 | 12/2003 |
| JP | 2004-126902 | 4/2004 |
| JP | 2011-191870 | 9/2011 |
| JP | 2012-106005 | 6/2012 |
| JP | 2012-521039 | 9/2012 |
| JP | 2012-528405 | 11/2012 |
| JP | 2012-533120 | 12/2012 |
| WO | 2010-107577 | 9/2010 |
| WO | 2010-138743 | 12/2010 |

OTHER PUBLICATIONS

Wen, Yan, et al. "A robust method of detecting hand gestures using depth sensors." Haptic Audio Visual Environments and Games (HAVE), 2012 IEEE International Workshop on. IEEE, 2012. 9 pages.*

International Preliminary Report on Patentability for International Patent Application No. PCT/JP2013/000909 dated Aug. 25, 2015, 9 pages.

Takuma Takeuchi, et al. "Development of Multi-Touch Table Identifying the Shape of Hand, and Study on the Interaction", Research Report of Information Processing Society of Japan, Apr. 15, 2012, vol. 2012-HCI-147, No. 14, pp. 1-6.

Takuya Takahashi, et al. Imaging measurement device of Gripped Attitude based on Hand Dimensions and Digital Hand Model, The Papers of Joint Technical Meeting on Information Processing and Information Oriented Industrial System, The Institute of Electrical Engineers of Japan Kenkyukai Shiryo, Jul. 25, 2008, IP-08-14, IIS-08-39, pp. 5-10.

International Search Report for International Patent Application No. PCT/JP2013/000909 dated Apr. 23, 2013.

* cited by examiner

SHAPE RECOGNITION DEVICE, SHAPE RECOGNITION PROGRAM, AND SHAPE RECOGNITION METHOD

TECHNICAL FIELD

The present invention relates to a shape recognition device, a shape recognition program, and a shape recognition method. Particularly, the present invention relates to a shape recognition device, a shape recognition program and a shape recognition method of recognizing an anatomic feature of an object.

BACKGROUND ART

Japanese Patent Publication No. 8-31140 (Patent Literature 1) discloses computer graphics, that is, a high-speed image generation/display method in which a vivid and realistic image is displayed on a screen at a high speed.

The high-speed image generation/display method according to Patent Literature 1 is a high-speed image generation/display method in which a target having a three-dimensional structure is projected and displayed on a two-dimensional screen. In this method, a constituent surface of the target is hierarchically described with the region size being defined as at least one element, in a target coordinate system. Then, when the constituent surface of the target taken from an arbitrary point of view is projected on the two-dimensional screen, the hierarchy level is set with the distance from the origin of a display reference coordinate system or the point of view to an arbitrary point of the target represented in the target coordinate system being defined as at least one parameter.

Japanese Patent Laid-Open No. 2004-126902 (Patent Literature 2) discloses a stereoscopic image generation method and a stereoscopic image generation device that efficiently generate a stereoscopic image with no load on an observer.

In the stereoscopic image generation method according to Patent Literature 2, object data to be planarly displayed, of objects each formed by a polygon having three-dimensional coordinates, is converted into reference camera coordinate system data whose origin is a reference camera, and object data to be stereoscopically displayed, of the objects, is converted into pieces of right-eye and left-eye parallax camera coordinate system data whose origins are respectively right-eye and left-eye parallax cameras having a predetermined parallactic angle therebetween. Then, the object data in the reference camera coordinate system and the object data in the right-eye parallax camera coordinate system are drawn as right-eye image data in a video memory, and the object data in the reference camera coordinate system and the object data in the left-eye parallax camera coordinate system are drawn as left-eye image data in the video memory. Then, the right-eye image data and the left-eye image data drawn in the video memory are composited with each other, and an image mixedly including the stereoscopic object and the planar object is displayed on a stereoscopic display device.

National Publication of International Patent Application No. 2012-533120 (Patent Literature 3) discloses a method using face recognition and gesture/body posture recognition techniques.

The method according to Patent Literature 3 is a method for applying attributes indicative of a user's temperament to a visual representation, the method including: rendering the visual representation of a user; receiving data of a physical space, the data being representative of the user in the physical space; analyzing at least one detectable characteristic to deduct, the user's temperament; and applying the attributes indicative of the user's temperament to the visual representation.

National Publication of International Patent Application No. 2012-528405 (Patent Literature 4) discloses a system and a method of supplying multi-mode input to a space or gesture calculation system.

The system according to Patent Literature 4 is a system including: an input device; and a detector that is coupled to a processor and detects an orientation of the input device. The input device has a plurality of mode orientations corresponding to the orientation. The plurality of mode orientations correspond to a plurality of input modes of a gesture control system. The detector is coupled to the gesture control system, and automatically controls selection of an input mode of the plurality of input modes in response to the orientation.

National Publication of International Patent Application No. 2012-521039 (Patent Literature 5) discloses a system, a method, and a computer-readable medium for manipulating a virtual object. The method according to Patent Literature 5 is a method of manipulating a virtual object in a virtual space, including: determining at least one controller that a user utilizes to manipulate the virtual object; mapping the controller to a cursor in the virtual space; determining controller input indicative of the user manipulating the virtual object with the cursor; and displaying a result of the manipulation.

Japanese Patent Laid-Open No. 2012-106005 (Patent Literature 6) discloses an image display device, a game program, and a game control method that enables an observer of the image display device to feel as if the observer could directly manipulate an actually non-existing stereoscopic image. The image display device according to Patent Literature 6 includes: image display means for displaying a parallax image on a display screen; first coordinate calculation means for calculating virtual space coordinates of a stereoscopic image that the observer of the parallax image recognizes between the display screen and the observer; second coordinate calculation means for calculating space coordinates of a manipulation object as a manipulation target of the observer; and event generation means for generating a predetermined event that changes at least one of the parallax image and an image on the display screen other than the parallax image, when a distance between the space coordinates of at least one point of the stereoscopic image calculated by the first coordinate calculation means and the space coordinates of at least one point of the manipulation object calculated by the second coordinate calculation means is equal to or less than a predetermined threshold.

CITATION LIST

Patent Literature

Patent Literature 1: Japanese Patent Publication No. 8-31140
Patent Literature 2: Japanese Patent Laid-Open No. 2004-126902
Patent Literature 3: National Publication of International Patent Application No. 2012-533120
Patent Literature 4: National Publication of International Patent Application No. 2012-528405
Patent Literature 5: National Publication of International Patent Application No. 2012-521039
Patent Literature 6: Japanese Patent Laid-Open No. 2012-106005

SUMMARY OF INVENTION

Technical Problem

The object of the present invention is to provide a shape recognition device, a shape recognition program, and a shape recognition method that can obtain more precise information for recognizing an external shape of an object.

Solution to Problem (1)

A shape recognition device according to one aspect includes an external-shape detecting unit that detects an external shape of an object, a first extracting unit that extracts a first feature point on the external shape based on the external shape detected by the external-shape detecting unit, and a second extracting unit that extracts a second feature point that exists on the external shape or in the external shape and differs from the first feature point.

The shape recognition device according to the present invention includes the external-shape detecting unit, the first extracting unit, and the second extracting unit. The external-shape detecting unit detects the external shape of the object. The first extracting unit extracts the first feature point on the external shape based on the external shape detected by the external-shape detecting unit. The second extracting unit extracts the second feature point that exists on the external shape or in the external shape and differs from the first feature point.

In this case, not only the first extracting unit but also the second extracting unit can extract not only the first feature point but also the second feature point. As a result, the number of the feature points increases so that more precise information for recognizing the external shape of the object can be obtained.

(2)

With regard to a shape recognition device according to a second invention, in the shape recognition device according to the one aspect, the first extracting unit may generate a polygon having vertexes at a plurality of external-shape points based on the external shape detected by the external-shape detecting unit and extract one of the vertexes of the polygon as the first feature point.

Furthermore, the second extracting unit may calculate a direction of a line segment connecting a pair of the vertexes that are disposed at both sides of the first feature point, calculate directions of sides constituting the polygon in order from the first feature point along an outer circumference of the polygon, and when a side of the polygon that has a direction most nearly parallel to the direction of the line segment is detected, the second extracting unit may extract a point based on a position of the detected side as the second feature point.

In this case, a position of part having a feature of the external shape of the object can be easily known.

The first extracting unit may generate a polygon having vertexes at a plurality of external-shape points based on the external shape detected by the external-shape detecting unit and extract a common vertex of the polygon and a convex hull of the polygon as the first feature point.

(3)

With regard to a shape recognition device according to a third invention, in the shape recognition device according to the one aspect, the first extracting unit may detect a plurality of external-shape points at predetermined intervals along the external shape detected by the external-shape detecting unit and extract one of the external-shape points as the first feature point.

Furthermore, the second extracting unit may calculate a length of a line segment connecting a pair of the external-shape points one of which is selected from the plurality of the external-shape points at one side of the first feature point and the other of which is selected from the external-shape points at the other side of the first feature point, in order from a position nearer to the first feature point to a farther position, detect a line segment that has a length a change amount of which is smaller than a predetermined amount and is farthest from the first feature point, and extract a point on the detected line segment as the second feature point.

In this case, a position of part having a feature of the external shape of the object can be easily known.

(4)

With regard to a shape recognition device according to the third invention, in the shape recognition device according to the one aspect or the third invention, the object may be at least a finger, a palm, a hand or an arm of a human body.

In this case, an anatomic feature of a finger, a palm, a hand or an arm of a human body can be easily recognized.

(5)

With regard to a shape recognition device according to a fifth invention, in the shape recognition device according to the one aspect or the fourth invention, the shape recognition device may further include an extending-direction detecting unit.

The extending-direction detecting unit detects a direction in which the object extends. The extending-direction detecting unit may determine that a direction of a line segment connecting the first feature point and the second feature point is an extending direction of the object.

In this case, the extending direction of the object can be known.

(6)

With regard to a shape recognition device according to a sixth invention, in the shape recognition device according to the one aspect or the fifth invention, the shape recognition device may further include a frame detecting unit.

Furthermore, the frame detecting unit detects a quadrangular frame surrounding the external shape detected by the external-shape detecting unit or the polygon having the vertexes at the plurality of the external-shape points generated based on the external shape. The extending-direction detecting unit may detect a direction of a longer side constituting the quadrangular frame.

In this case, the extending direction of the object that has the extending direction can be known.

(7)

With regard to a shape recognition device according to a seventh invention, in the shape recognition device according to any one of the fourth to sixth inventions, the object may be a hand. Furthermore, the first extracting unit may extract a point of a tip of a finger as the first feature point and the second extracting unit may extract a point of a base of the finger as the second feature point so that the finger may be recognized.

In this case, the tip and the base of the finger can be recognized so that a direction of the finger can be recognized. In other words, the finger of the hand having a complicated shape can be easily recognized.

(8)

With regard to a shape recognition device according to an eighth invention, in the shape recognition device according to any one of the fourth to seventh inventions, the shape recognition device may further include a palm recognition unit that recognizes a palm part.

Furthermore, the palm recognition unit may recognize the palm part based on the external shape detected by the external-shape detecting unit or a maximum inscribed circle of the polygon having the vertexes at the plurality of the external-shape points generated based on the external shape.

In this case, the palm can be easily and reliably recognized.

(9)

With regard to a shape recognition device according to a ninth invention, in the shape recognition device according to any one of the fourth to eighth inventions, the shape recognition device may further include a thumb recognition unit that recognizes a thumb of the hand.

Furthermore, the thumb recognition unit may recognize the thumb based on at least either the first feature points or the second feature points of a plurality of fingers.

In this case, existence or absence of the thumb can be easily and reliably recognized. Recognition of the thumb can facilitate determination of the back of the hand and the palm.

(10)

With regard to a shape recognition device according to a tenth invention, in the shape recognition device according to the ninth invention, the shape recognition device may further include a hand-shape identifying unit.

Furthermore, the hand-shape identifying unit may identify a shape of the hand based on information of the fingers recognized by the first extracting unit and the second extracting unit and the thumb recognized by the thumb-recognition unit.

In this case, the finger and the palm are recognized so that a pose of the hand that can have a complicated shape can be easily identified.

(11)

With regard to a shape recognition device according to an eleventh invention, in the shape recognition device according to any one of the one aspect to the tenth invention, the external-shape detecting unit may be an infrared camera.

In this case, the external shape of the object can be precisely detected by infrared rays.

(12)

With regard to a shape recognition device according to a twelfth invention, in the shape recognition device according to any one of one aspect to the eleventh invention, the shape recognition device may further include a display device that can display a stereoscopic image. Furthermore, the external-shape detecting unit may include a depth level sensor measuring a distance to the object. The external-shape detecting unit may detect the external shape of the object at least either in a depth level detection region of the depth level sensor or in a common region that is shared by a stereoscopic region of the stereoscopic image generated by the display device and the depth level detection region.

In this case, visual recognition of the stereoscopic image in the common region and shape identification of the object existing in a visual field of the stereoscopic image can be simultaneously performed. In other words, while the stereoscopic image is displayed, shape recognition of the object can be performed.

Moreover, the depth level refers to the distance from the depth level sensor to the target object that is a detection target.

(13)

A head-mounted display device according another aspect includes the shape recognition device according to any one of claims 1 to 12.

A head-mounted display device according the thirteenth invention includes the shape recognition device according to any one of claims 1 to 12.

In this case, the shape recognition device is provided in the head-mounted display device so that shape recognition can be performed with the head-mounted display device attached to a body.

(14)

A shape recognition program according to still another aspect includes an external-shape detection process of detecting an external shape of an object, a first extraction process of extracting a first feature point on the external shape based on the external shape detected in the external-shape detection process, and a second extraction process of extracting a second feature point that exists on the external shape or in the external shape and differs from the first feature point.

A shape recognition program according to the thirteenth invention includes an external-shape detection process, a first extraction process and a second extraction process. In the external-shape detection process, an external shape of an object is detected. In the first extraction process, a first feature point of the external shape is extracted based on the external shape detected in the external-shape detection process. In the second extraction process, a second feature point that exists on the external shape or in the external shape and differs from the first feature point is extracted.

In this case, not only a first extracting unit but also a second extracting unit can extract not only the first feature point but also the second feature point. As a result, the number of the feature points increases so that more precise information for recognizing the external shape of the object can be obtained.

(15)

With regard to a shape recognition program according to a fifteenth invention, in the shape recognition program according to still another aspect, the shape recognition program may further include an extending-direction detection process of detecting a direction in which the object extends. In the extending-direction detection process, it may be determined that a direction of a line segment connecting the first feature point and the second feature point is an extending direction of the object.

In this case, the extending direction of the object can be known.

(16)

With regard to a shape recognition program according to a sixteenth invention, in the shape recognition program according to still another aspect and the fifteenth invention, the shape recognition program may further include a frame detection process. Furthermore, in the frame detection process, a quadrangular frame surrounding the external shape detected in the external-shape detection process or a polygon having vertexes at a plurality of external-shape points generated based on the external shape may be detected. In the extending-direction detection process, a direction of a longer side constituting the quadrangular frame may be detected.

In this case, the extending direction of the object can be known.

(17)

With regard to a shape recognition program according to a seventeenth invention, in the shape recognition program according to any one of still another aspect to the sixteenth invention, the object may be a hand, the first extraction process may include a first finger recognition process, and the second extraction process may include a second finger recognition process. In the first finger recognition process, a point of a tip of a finger may be extracted as the first feature point. In the second extraction process, a point of a base of the finger may be detected as the second feature point. From the point of the tip and the point of the base, the finger may be recognized.

In this case, the tip and the base of the finger can be recognized so that a direction of the finger can be recognized. In other words, the finger of the hand having a complicated shape can be easily recognized.

(18)

With regard to a shape recognition program according to an eighteenth invention, in the shape recognition program according to the seventeenth invention, the shape recognition program may further include a palm recognition process of recognizing a palm part. In the palm recognition process, the palm part may be recognized based on the external shape detected in the external-shape detection process or a maximum inscribed circle of the polygon having the vertexes at the plurality of the external-shape points generated based on the external shape.

In this case, a palm can be easily and reliably recognized.

(19)

With regard to a shape recognition program according to a nineteenth invention, in the shape recognition program according to the seventeenth or eighteenth invention, the shape recognition program may further include a thumb recognition process of recognizing a thumb of the hand. In the thumb recognition process, the thumb may be recognized based on at least either the first feature points or the second feature points of a plurality of fingers.

In this case, existence or absence of the thumb can be easily and reliably recognized. Recognition of the thumb can facilitate determination of the back of the hand and the palm.

(20)

With regard to a shape recognition program according to a twentieth invention, in the shape recognition program according to the nineteenth invention, the shape recognition program may further include a hand-shape identification process. In the hand-shape identification process, a shape of the hand may be recognized based on information of the fingers recognized in the first extraction process and the second extraction process and the thumb recognized in the thumb recognition process.

In this case, the finger and the palm are recognized so that a pose of the hand that can have a complicated shape can be easily identified.

(21)

With regard to a shape recognition program according to a twenty-first invention, in the shape recognition program according to any one of still another aspect to the twentieth invention, the shape recognition program may further include a display process capable of displaying a stereoscopic image. The external-shape detection process may include a depth level sensor process of measuring a distance to the object, and the external shape of the object may be detected at least either in a depth level detection region detected in the depth level sensor process or in a common region that is shared by a stereoscopic region of the stereoscopic image generated in the display process and the depth level detection region.

In this case, visual recognition of the stereoscopic image in the common region and shape identification of the object existing in a visual field of the stereoscopic image can be simultaneously performed. In other words, while the stereoscopic image is displayed, shape recognition of the object can be performed.

The depth level refers to the distance from the depth level sensor to the object that is a detection target.

(22)

A shape recognition method according to still another aspect includes an external-shape detection step of detecting an external shape of an object, a first extraction step of extracting a first feature point on the external shape based on the external shape detected in the external-shape detection step, and a second extraction step of extracting a second feature point that exists on the external shape or in the external shape and differs from the first feature point.

The shape recognition method according to the present invention includes an external-shape detection step, a first extraction step, and a second extraction step. In the external-shape detection step, an external shape of an object is detected. In the first extraction step, a first feature point on the external shape is detected based on the external shape detected in the external-shape detection step. In the second extraction step, a second feature point that exists on the external shape or in the external shape and differs from the first feature point is extracted.

In this case, not only a first extracting unit but also a second extracting unit can extract not only the first feature point but also the second feature point. As a result, the number of the feature points increases so that more precise information for recognizing the external shape of the object can be obtained.

(23)

With regard to a shape recognition method according to a twenty-third invention, in the shape recognition method according to still another aspect, the shape recognition method may further include an extending-direction detection step of detecting a direction in which the object extends. In the extending-direction detection step, it may be determined that a direction of a line segment connecting the first feature point and the second feature point is an extending direction of the object.

In this case, the extending direction of the object can be known.

(24)

With regard to a shape recognition method according to a twenty-fourth invention, in the shape recognition method according to still another aspect and the twenty-third invention, the shape recognition method may further include a frame detection step. In the frame detection step, a quadrangular frame surrounding the external shape detected in the external-shape detection step or a polygon having vertexes at a plurality of external-shape points generated based on the external shape may be detected. In the extending-direction detection step, a direction of a longer side constituting the quadrangular frame may be detected.

In this case, the extending direction of the object can be known.

(25)

With regard to a shape recognition method according to a twenty-fifth invention, in the shape recognition method according to any one of still another aspect to the twenty-fourth invention, the object may be a hand, the first extraction step may include a first finger recognition step, and the second extraction step may include a second finger recognition step. In the first finger recognition step, a point of a tip of a finger may be extracted as the first feature point. In the second extraction step, a point of a base of the finger may be extracted as the second feature point. From the point of the tip and the point of the base, the finger may be recognized.

In this case, the tip and the base of the finger can be recognized so that a direction of the finger can be recognized. In other words, the finger of the hand having a complicated shape can be easily recognized.

(26)

With regard to a shape recognition method according to a twenty-sixth invention is the shape recognition method according to the twenty-fifth invention, the shape recognition method may further include a palm recognition step of recognizing a palm part. In the palm recognition step, the palm part may be recognized based on the external shape detected in the external-shape detection step or a maximum inscribed circle of the polygon having the vertexes at the plurality of the external-shape points generated based on the external shape.

In this case, a palm can be easily and reliably recognized.

(27)

With regard to a shape recognition method according to a twenty-seventh invention, in the shape recognition method according to the twenty-fifth or twenty-sixth invention, the shape recognition method may further include a thumb recognition step of recognizing a thumb of the hand. In the thumb recognition step, the thumb may be recognized based on at least either the first feature points or the second feature points of a plurality of fingers.

In this case, existence or absence of the thumb can be easily and reliably recognized. Recognition of the thumb can facilitate determination of the back and the palm of the hand.

(28)

With regard to a shape recognition method according to a twenty-eighth invention, in the shape recognition method according to the twenty-seventh invention, the shape recognition method may further include a hand-shape identification step. In the hand-shape identification step, a shape of a hand may be recognized based on information of the fingers recognized in the first extraction step and the second extraction step and the thumb recognized in the thumb recognition step.

In this case, the finger and the palm are recognized so that a pose of the hand that can have a complicated shape can be easily identified.

(29)

With regard to a shape recognition method of a twenty-ninth invention, in the shape recognition method according to any one of still another aspect to the twenty-eighth invention, the shape recognition method may further include a display step capable of displaying a stereoscopic image. The external-shape detection step may include a depth level sensor step of measuring a distance to the object, and the external shape of the object may be detected at least either in a depth level detection region detected in the depth level sensor step or in a common region that is shared by a stereoscopic region of the stereoscopic image generated in the display step and the depth level detection region.

In this case, visual recognition of the stereoscopic image in the common region and shape identification of the object existing in a visual field of the stereoscopic image can be simultaneously performed. In other words, while the stereoscopic image is displayed, shape recognition of the object can be performed.

The depth level refers to the distance from the depth level sensor to the object that is a detection target.

Advantageous Effects of Invention

The present invention can provide a shape recognition device, a shape recognition program, and a shape recognition method that can obtain more precise information for recognizing an external shape of an object.

Figure 1:
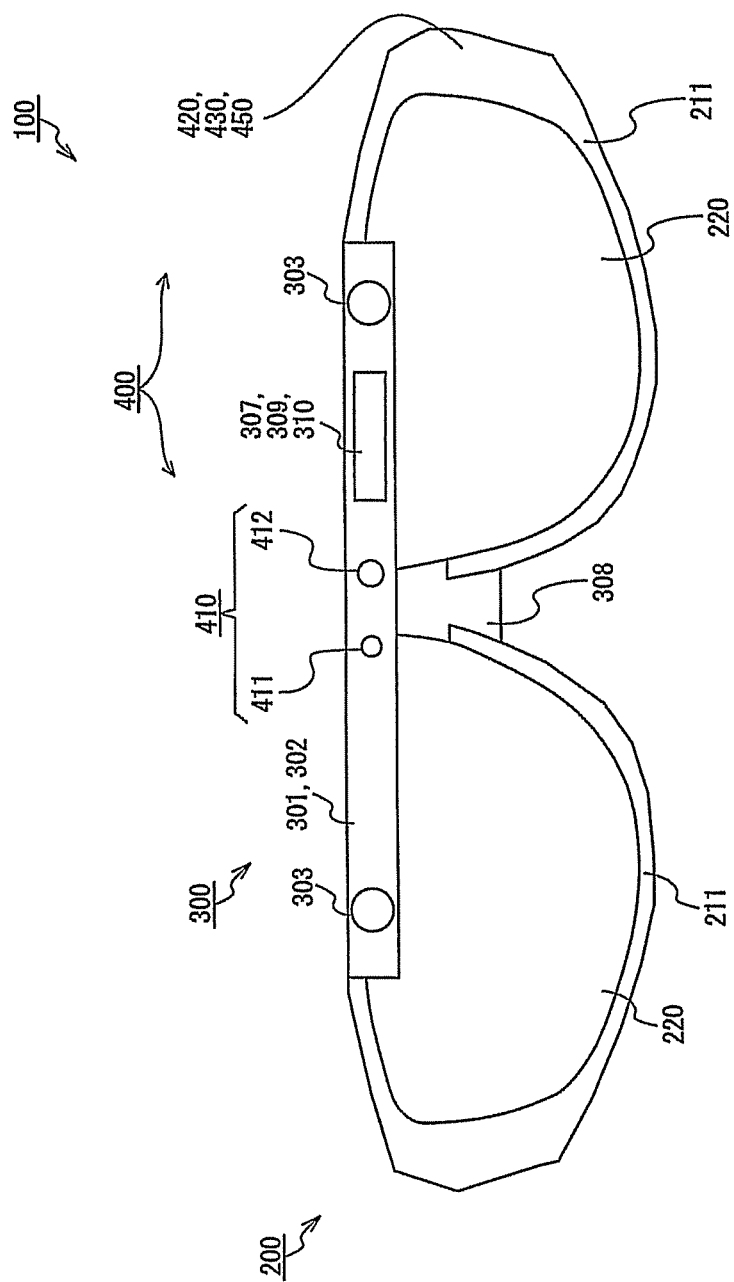
FIG. 1 is a schematic external front view illustrating an example of a basic configuration of a glasses display device 100 according to an embodiment.

REFERENCE SIGNS LIST 100 glasses display device
220 semi-transmissive display
221 advertisement
2203D virtual image display region (common region)
300 communication system
303 camera unit
410 infrared ray detection unit
410c manipulation region
420 gyroscope unit
430 acceleration detection unit
4103D three-dimensional space detection region
450 control unit
454 anatomy recognition unit
456 gesture recognition unit
460 event service unit
461 calibration service unit
701 to 707 view
900 I/O device
H1 hand
H2, H3 shadow
RP right shoulder joint
LP left shoulder joint
OF outer shape
$p_n$, $p_0$, $p_1$ vertex
$PP_1$ reference line segment
$pp_2$ side
$pp_k$ side
P0 tip point
P1 base point
C maximum inscribed circle
V3 face recognition application screen
V5 SNS application screen

DESCRIPTION OF EMBODIMENT

Hereinafter, an embodiment of the present invention is described with reference to the drawings. In the following description, the same reference signs are given to the same components. The names and functions thereof are the same. Accordingly, detailed description thereof is not repeated.

Moreover, the present invention is not limitatively applied to the following glasses display device, and can also be applied to other I/O devices, display devices, televisions, monitors, projectors, and the like.

(Configuration Outline of Glasses Display Device)

Figure 2:
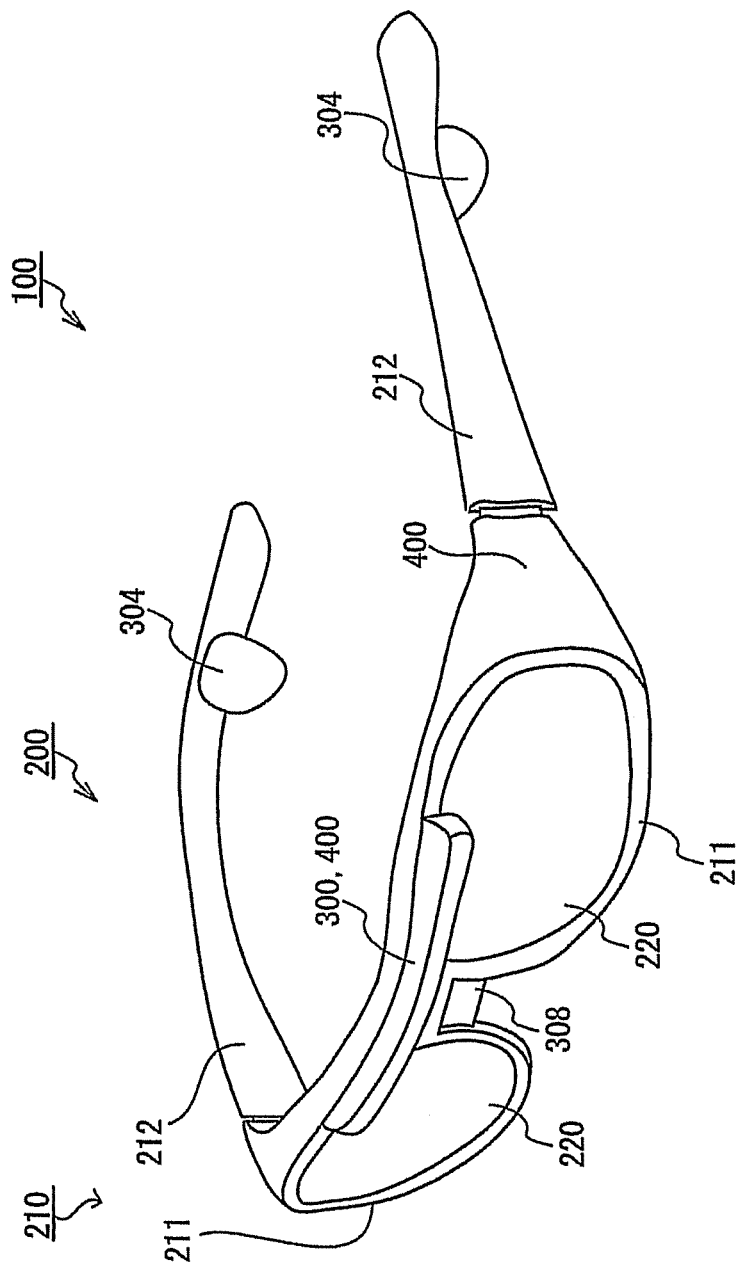
FIG. 2 is a schematic external perspective view illustrating an example of the glasses display device 100.

FIG. 1 is a schematic external front view illustrating an example of a basic configuration of a glasses display device 100 according to an embodiment, and FIG. 2 is a schematic external perspective view illustrating an example of the glasses display device 100.

As illustrated in FIG. 1 or FIG. 2, the glasses display device 100 is a glasses-shaped display device. As described later, the glasses display device 100 is used while being attached to the face of a user.

As illustrated in FIG. 1 and FIG. 2, the glasses display device 100 mainly includes a glasses unit 200, a communication system 300, and an operation system 400.

(Glasses Unit 200)

As illustrated in FIG. 1 and FIG. 2, the glasses unit 200 includes a glasses frame 210 and a pair of semi-transmissive displays 220. The glasses frame 210 mainly includes a rim unit 211 and a temple unit 212.

The pair of semi-transmissive displays 220 is supported by the rim unit 211 of the glasses frame 210.

In the present embodiment, the rim unit 211 of the glasses display device 100 is provided with the pair of semi-transmissive displays 220. Not limited thereto, the rim unit 211 of the glasses display device 100 may be provided with lenses such as normal sunglasses lenses, ultraviolet protection lenses, or glasses lenses, and one semi-transmissive display 220 or the pair of semi-transmissive displays 220 may be separately provided.

Alternatively, the semi-transmissive display(s) 220 may be provided so as to be embedded in part of the lenses.

Further, the present embodiment is not limited to such a glasses type, and can be applied to a hat type and other arbitrary head-mounted display devices as long as the device can be attached to the body of a person and can be arranged within the field of view of the person.

(Communication System 300)

Next, the communication system 300 is described. The communication system 300 includes a battery unit 301, an antenna module 302, a camera unit 303, a speaker unit 304, a global positioning system (GPS) unit 307, a microphone unit 308, a subscriber identity module card (SIM) unit 309, and a main unit 310.

Note that the camera unit may be provided with a CCD sensor. The speaker unit 304 may be normal earphones, and may be bone-conduction earphones. The SIM unit 309 includes a near field communication (NFC) unit, another contact-type IC card unit, and a contactless IC card unit.

As described above, the communication system 300 according to the present embodiment at least has any of the functions of a mobile phone, a smartphone, and a tablet terminal. Specifically, the communication system 300 has a phone function, an Internet function, a browser function, an e-mail function, an image taking function, and the like.

Accordingly, with the use of the glasses display device 100, the user can use a phone call function similar to that of a mobile phone by means of the communication device, the speaker, and the microphone. Moreover, because the glasses display device 100 is glasses-shaped, the user can make a phone call without using both his/her hands.

(Operation System 400)

Next, the operation system 400 includes an infrared ray detection unit 410, a gyroscope unit 420, an acceleration detection unit 430, and a control unit 450. The infrared ray detection unit 410 mainly includes an infrared ray emission element 411 and an infrared ray detection camera 412.

Figure 3:
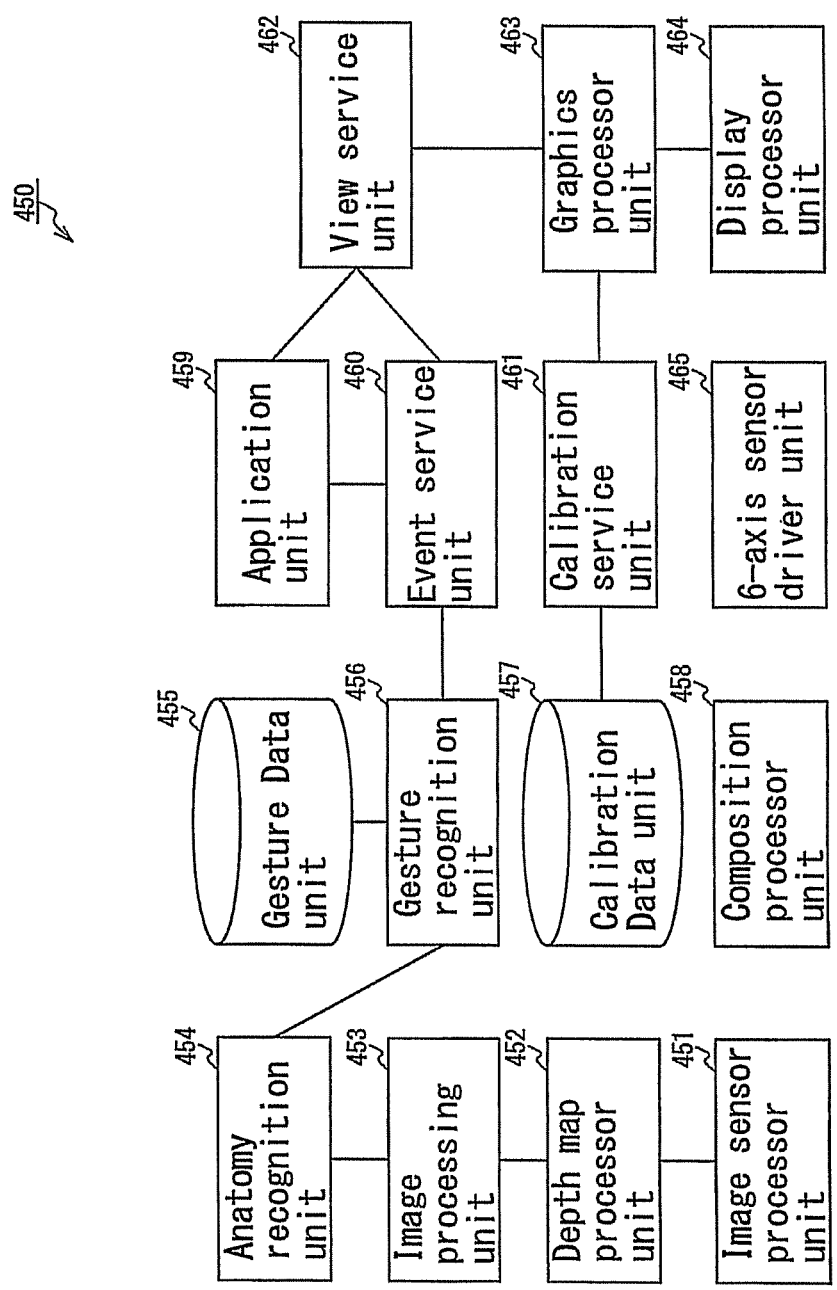
FIG. 3 is a schematic diagram illustrating an example of a configuration of a control unit 450 of an operation system 400.

Next, a configuration, a processing flow, and a concept of the operation system 400 are described. FIG. 3 is a schematic diagram illustrating an example of a configuration of the control unit 450 of the operation system 400.

As illustrated in FIG. 3, the control unit 450 includes an image sensor processor unit 451, a depth map processor unit 452, an image processing unit 453, an anatomy recognition unit 454, a gesture data unit 455, a gesture recognition unit 456, a calibration data unit 457, a composition processor unit 458, an application unit 459, an event service unit 460, a calibration service unit 461, a view service unit 462, a graphics processor unit 463, a display processor unit 464, and a 6-axis sensor driver unit 465.

Note that the control unit 450 does not need to include all the above-mentioned units, and may include one or more necessary units as appropriate. For example, the gesture data unit 455 and the calibration data unit 457 may be arranged on a cloud service, and the composition processor unit 458 may not be particularly provided.

Figure 4:
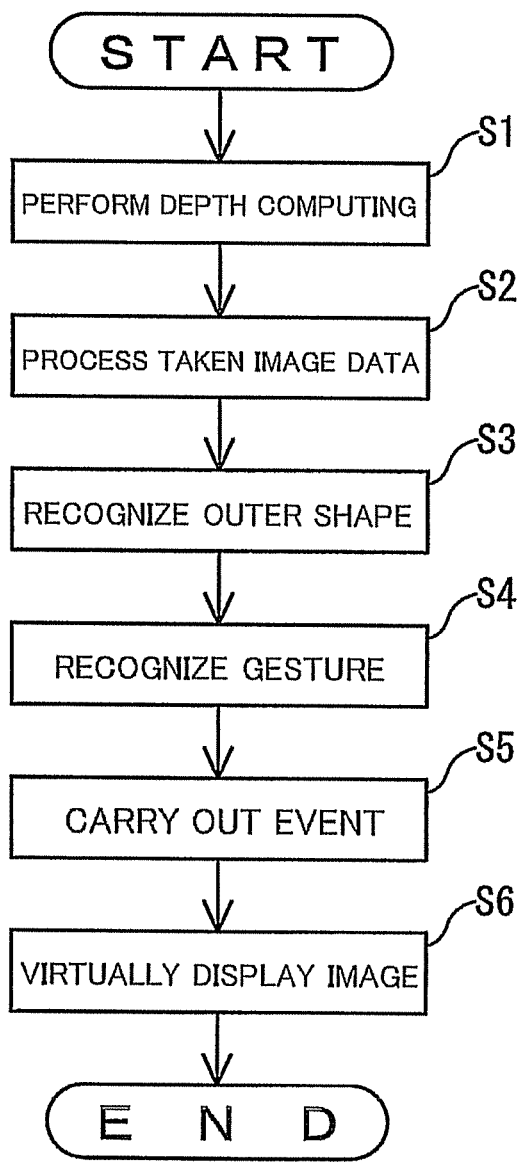
FIG. 4 is a flowchart illustrating a processing flow in the operation system 400.
Figure 5:
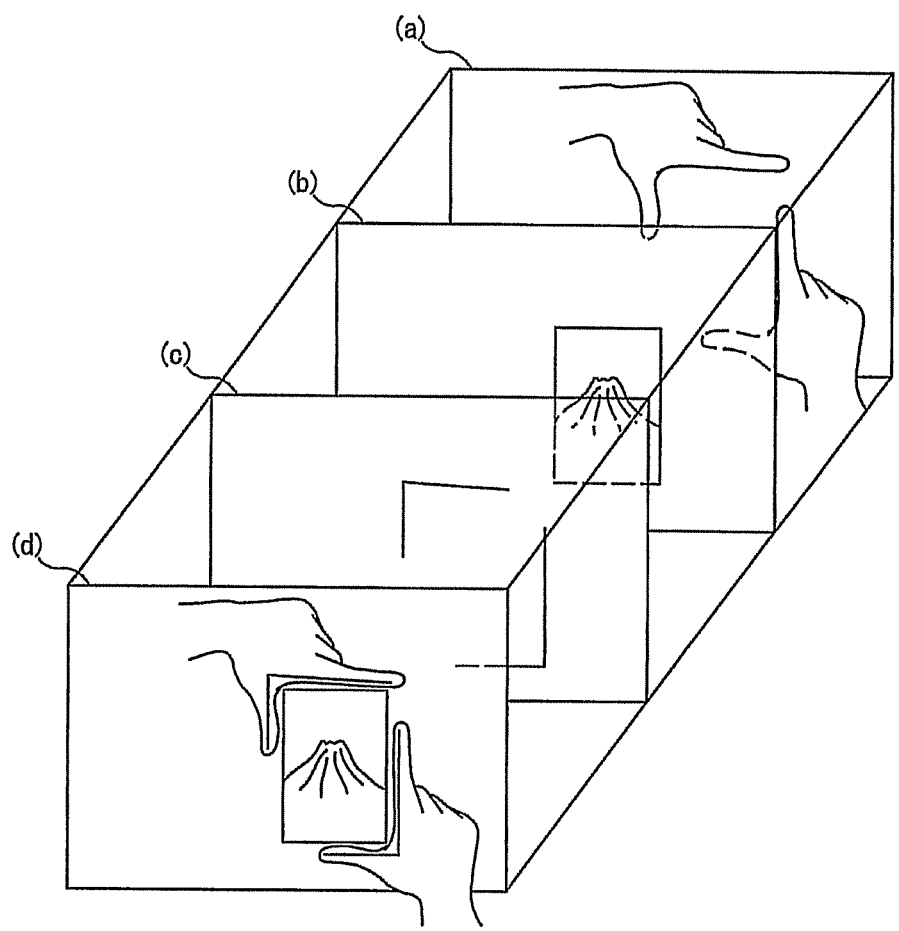
FIG. 5 is a schematic diagram illustrating a concept corresponding to the flowchart of FIG. 4.

Next, FIG. 4 is a flowchart illustrating a processing flow in the operation system 400, and FIG. 5 is a schematic diagram illustrating a concept according to the flowchart of FIG. 4.

First, as illustrated in FIG. 4, target data is acquired from the infrared ray detection unit 410, and depth computing is performed by the depth map processor unit 452 (Step S1). Then, outer shape image data is processed by the image processing unit 453 (Step S2).

Subsequently, on the basis of the structure of a standard human body, an anatomic feature is recognized from the outer shape image data processed in Step S2, by the anatomy recognition unit 454. As a result, an outer shape is recognized (Step S3).

Further, on the basis of the anatomic feature obtained in Step S3, a gesture is recognized by the gesture recognition unit 456 (Step S4).

The gesture recognition unit 456 refers to gesture data recorded in the gesture data unit 455, and recognizes the gesture from the outer shape whose anatomic feature has been recognized. Note that, although it is assumed that the gesture recognition unit 456 refers to the gesture data recorded in the gesture data unit 455, not limited thereto, the gesture recognition unit 456 may refer to other arbitrary data, and may perform processing without any reference.

In such a manner as described above, a gesture of hands is recognized as illustrated in FIG. 5(a).

Subsequently, the application unit 459 and the event service unit 460 carry out a predetermined event in accordance with the gesture recognized by the gesture recognition unit 456 (Step S5).

As a result, as illustrated in FIG. 5(b), for example, an image is displayed by a picture application. On this occasion, taken image data from the camera unit 303 may be displayed on this screen.

Lastly, the view service unit 462, the calibration service unit 461, the graphics processor unit 463, the display processor unit 464, and the composition processor unit 458 display or virtually display an image on the semi-transmissive displays 220 (Step S6). As a result, skeletons of the hands indicating the gesture are displayed as illustrated in FIG. 5(c), and a composite image that is formed such that the shape and size of a picture coincide with the shape and size of the skeletons is displayed as illustrated in FIG. 5(d).

Note that the 6-axis sensor driver unit 465 always detects signals from the gyroscope unit 420 and the acceleration detection unit 430, and transmits a posture condition to the display processor unit 464.

In the case where the user to whom the glasses display device 100 is attached inclines the glasses display device 100, the 6-axis sensor driver unit 465 always receives signals from the gyroscope unit 420 and the acceleration detection unit 430, and controls image display. In this control, the displayed image may be kept horizontal, and may be adjusted in accordance with the inclination.

(One Example of Detection Region and Virtual Display Region)

Next, a relation between a detection region of the infrared ray detection unit 410 of the operation system 400 and a virtual display region of the pair of semi-transmissive displays 220 is described.

Figure 6:
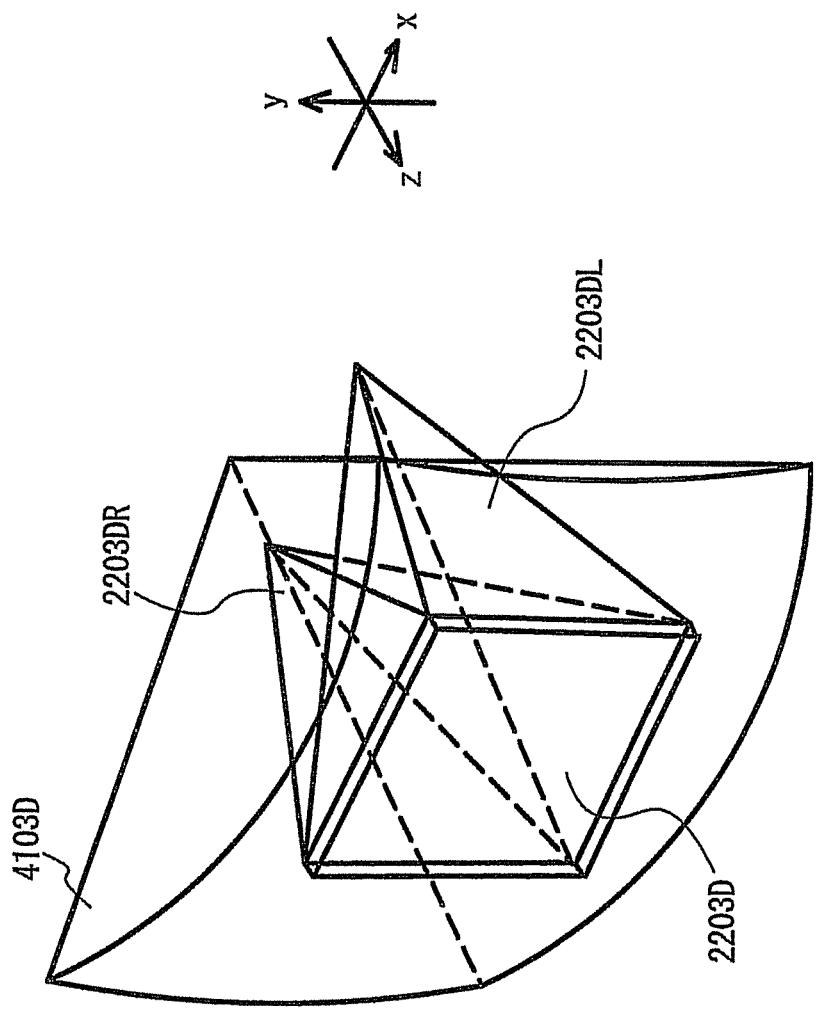
FIG. 6 is a schematic perspective view for describing a detection region of an infrared ray detection unit 410 and a virtual display region of a pair of semi-transmissive displays 220.
Figure 7:
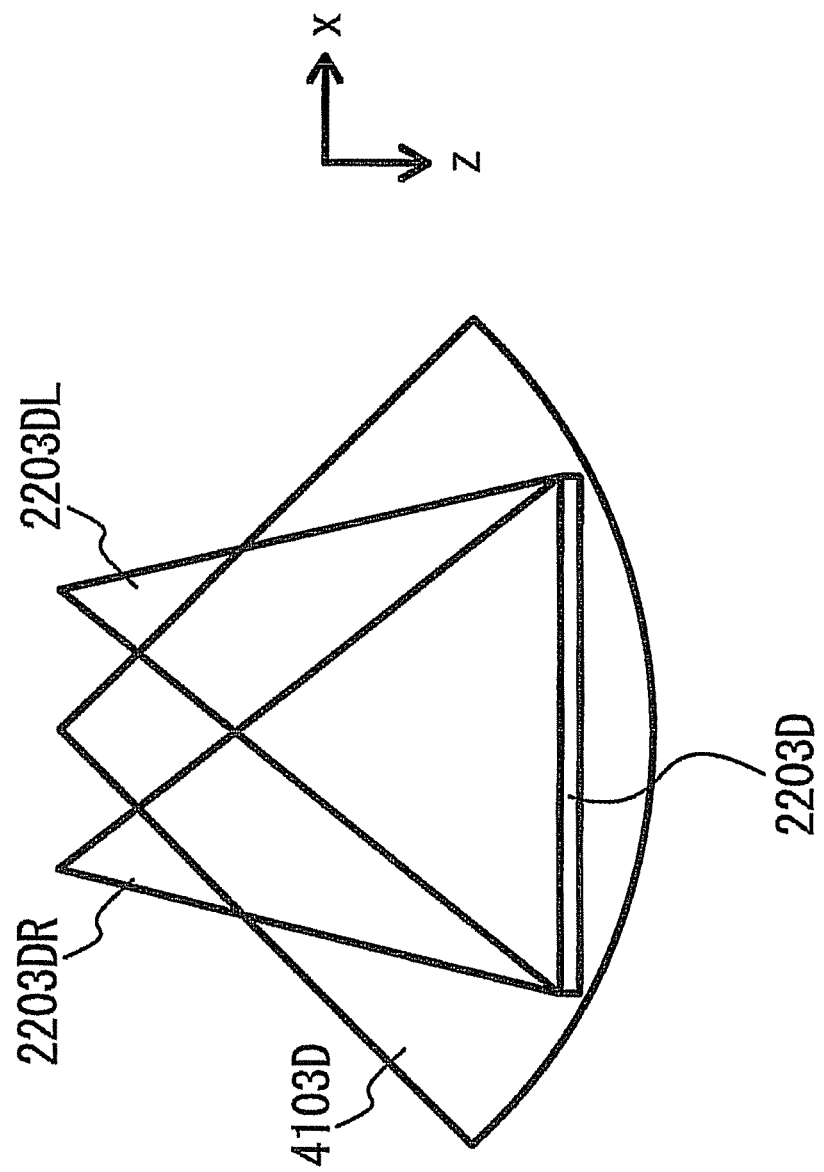
FIG. 7 is a top view of FIG. 6.
Figure 8:
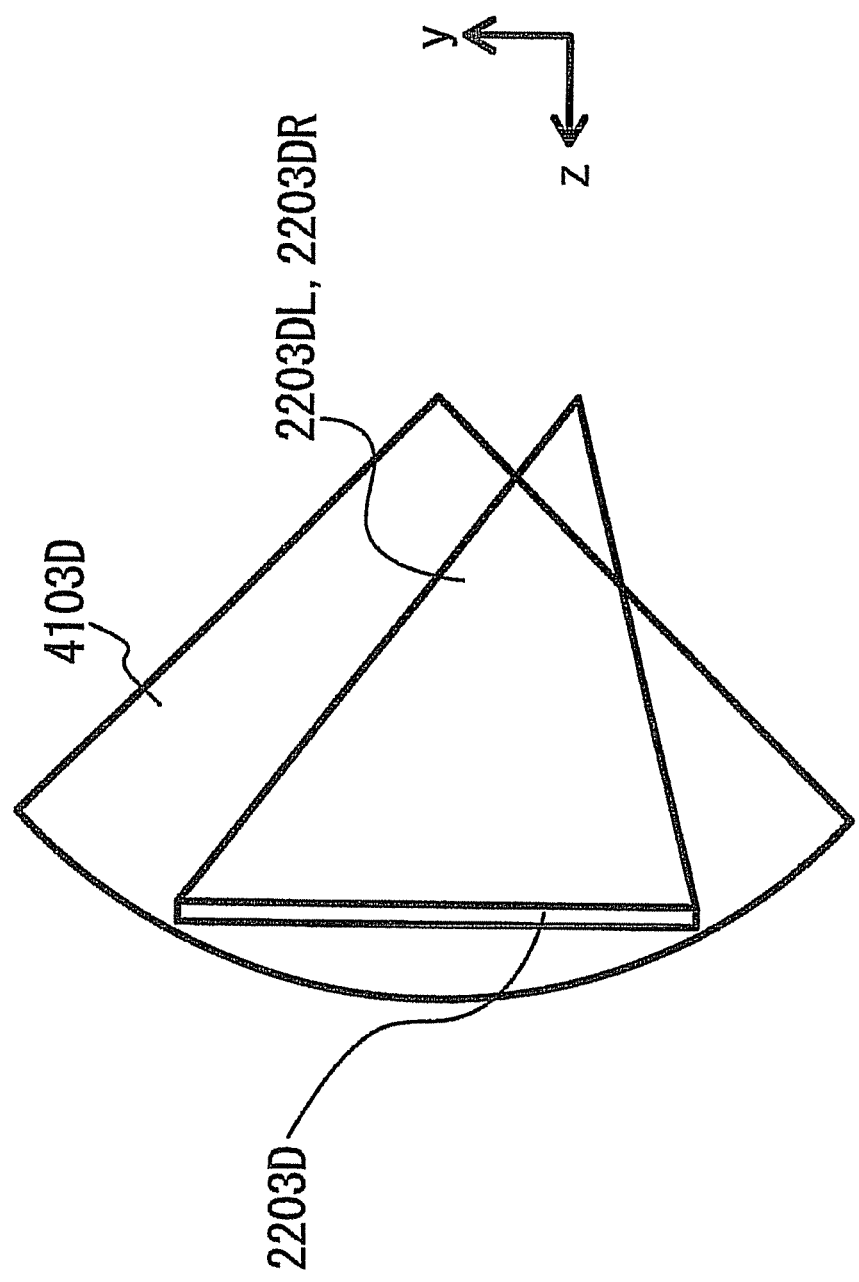
FIG. 8 is a side view of FIG. 6.

FIG. 6 is a schematic perspective view for describing the detection region of the infrared ray detection unit 410 and the virtual display region of the pair of semi-transmissive displays 220, FIG. 7 is a top view of FIG. 6, and FIG. 8 is a side view of FIG. 6.

In the following, for convenience of description, a three-dimensional orthogonal coordinate system formed by an x-axis, a y-axis, and a z-axis is defined as illustrated in FIG. 6. In the following drawings, an x-axis arrow indicates the horizontal direction. A y-axis arrow indicates the vertical direction or the long axis direction of the user's body. A z-axis arrow indicates the depth level direction. The z-axis positive direction indicates the direction of a higher depth level. The direction of each arrow is the same in the other drawings.

As illustrated in FIG. 6 to FIG. 8, a three-dimensional space detection region (3D space) 4103D in which detection by the infrared ray detection unit 410 of the operation system 400 is possible is provided.

The three-dimensional space detection region 4103D is formed by a conical or pyramidal three-dimensional space extending from the infrared ray detection unit 410.

That is, infrared rays emitted from the infrared ray emission element 411 can be detected by the infrared ray detection camera 412, and hence the infrared ray detection unit 410 can recognize a gesture in the three-dimensional space detection region 4103D.

Moreover, although one infrared ray detection unit 410 is provided in the present embodiment, not limited thereto, a plurality of the infrared ray detection units 410 may be provided, and one infrared ray emission element 411 and a plurality of the infrared ray detection cameras 412 may be provided.

Subsequently, as illustrated in FIG. 6 to FIG. 8, the pair of semi-transmissive displays 220 is visually recognized by the user as a virtual display with a depth in not an actual place of the glasses display device 100 but a virtual image display region 2203D that is a place apart from the glasses display device 100. The depth corresponds to the thickness in the depth level direction (z-axis direction) of a virtual stereoscopic shape of the virtual image display region 2203D. Accordingly, the depth is provided in accordance with the thickness in the depth level direction (z-axis direction) of the virtual stereoscopic shape.

That is, although images are respectively displayed on the semi-transmissive displays 220 of the glasses display device 100 in actuality, a right-eye image is transmitted through the semi-transmissive display 220 on the right-eye side to be recognized by the user in a three-dimensional space region 2203DR, and a left-eye image is transmitted through the semi-transmissive display 220 on the left-eye side to be recognized by the user in a three-dimensional space region 2203DL. As a result, the two recognized images are composited with each other in the brain of the user, whereby the user can recognize the two images as a virtual image in the virtual image display region 2203D.

Moreover, the virtual image display region 2203D is displayed using any of a frame sequential method, a polarization method, a linear polarization method, a circular polarization method, a top-and-bottom method, a side-by-side method, an anaglyph method, a lenticular method, a parallax barrier method, a liquid crystal parallax barrier method, a two-parallax method, and a multi-parallax method using three or more parallaxes.

Moreover, in the present embodiment, the virtual image display region 2203D includes a space region common to the three-dimensional space detection region 4103D. In particular, as illustrated in FIG. 6 and FIG. 7, the virtual image display region 2203D exists inside of the three-dimensional space detection region 4103D, and hence the virtual image display region 2203D corresponds to the common region.

Note that the shape and size of the virtual image display region 2203D can be arbitrarily adjusted by a display method on the pair of semi-transmissive displays 220.

Moreover, as illustrated in FIG. 8, description is given above of the case where the infrared ray detection unit 410 is arranged above (y-axis positive direction) the pair of semi-transmissive displays 220. Even if the arrangement position in the vertical direction (y-axis direction), of the infrared ray detection unit 410 is below (y-axis negative direction) the semi-transmissive displays 220 or the same as the position of the semi-transmissive displays 220, the virtual image display region 2203D similarly includes a space region common to the three-dimensional space detection region 4103D.

(Other Examples of Detection Region and Virtual Display Region)

Figure 9:
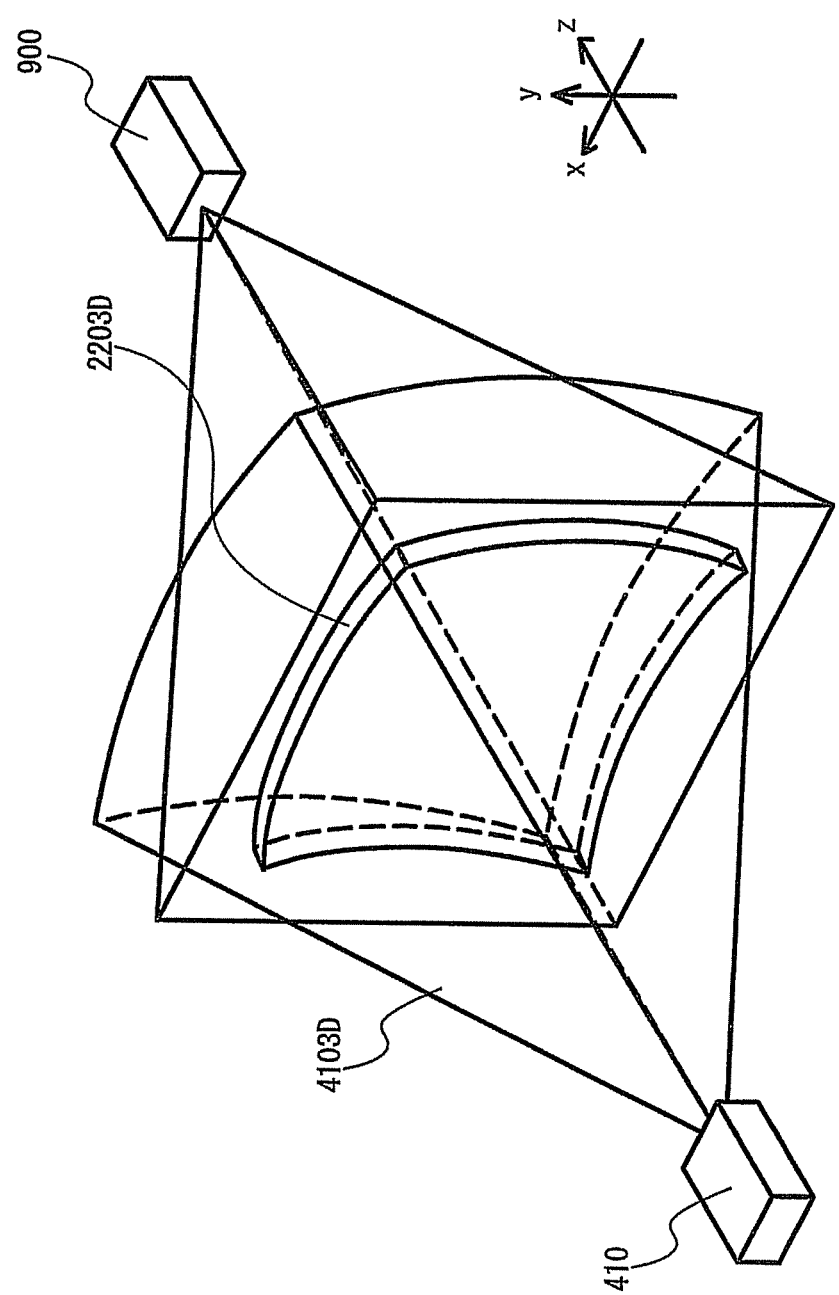
FIG. 9 is a schematic diagram illustrating another example of the detection region and the virtual display region.
Figure 10:
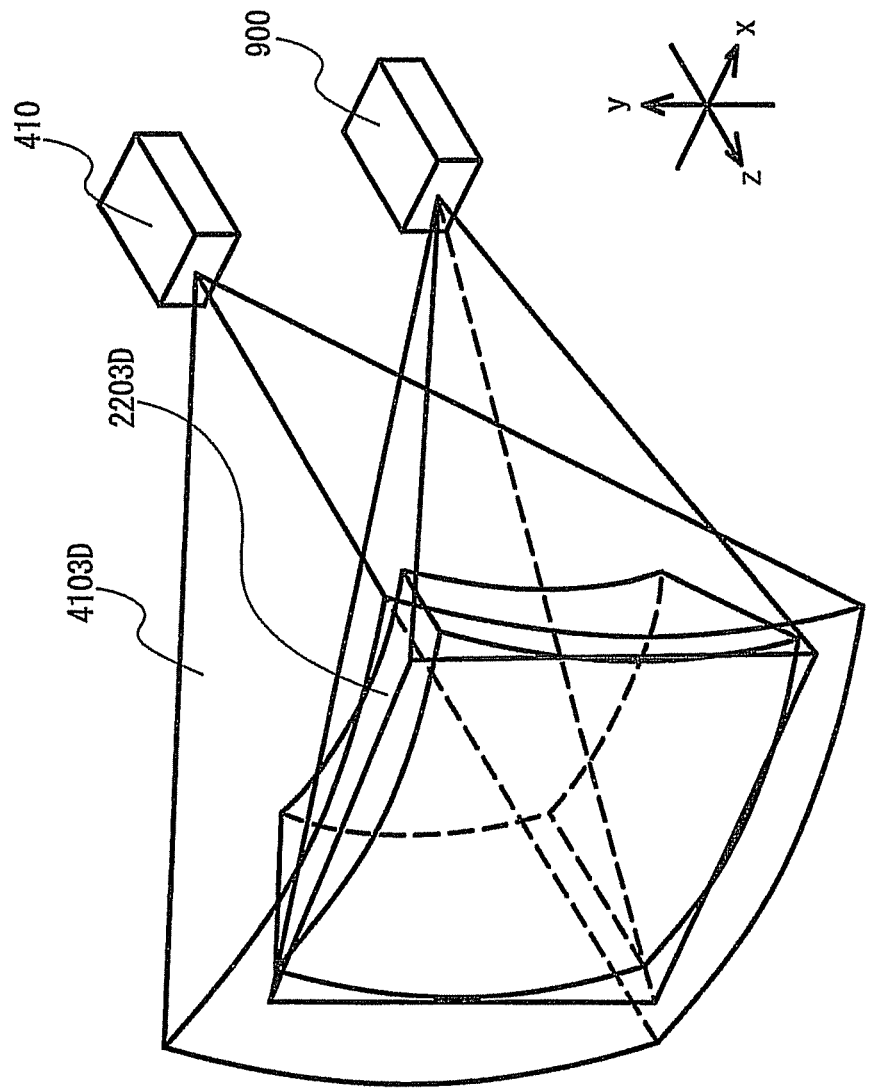
FIG. 10 is a schematic diagram illustrating another example of the detection region and the virtual display region.
Figure 11:
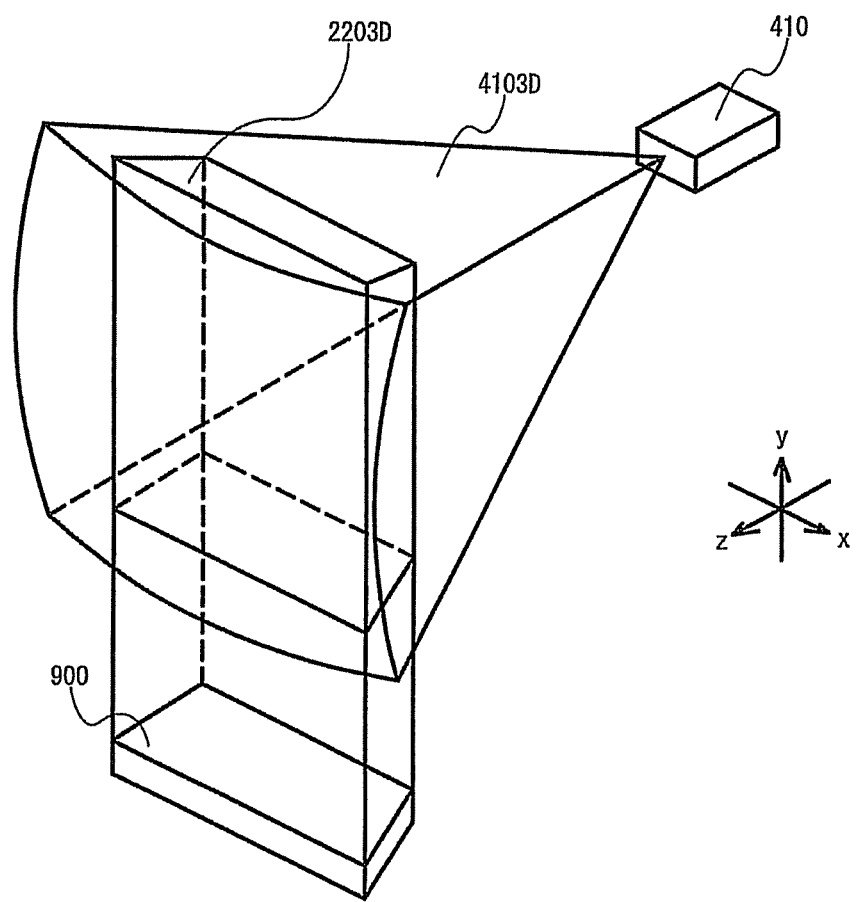
FIG. 11 is a schematic diagram illustrating another example of the detection region and the virtual display region.

Next, FIG. 9 to FIG. 11 are schematic diagrams respectively illustrating other examples of the detection region and the virtual display region illustrated in FIG. 6 to FIG. 8.

For example, as illustrated in FIG. 9 to FIG. 11, other I/O devices, display devices, televisions, monitors, and the like may be used instead of the semi-transmissive displays 220 of the glasses display device 100. Hereinafter, other I/O devices, display devices, televisions, monitors, and projectors are collectively referred to as an I/O device 900.

As illustrated in FIG. 9, the virtual image display region 2203D may be outputted in the z-axis negative direction from the I/O device 900, and the three-dimensional space detection region 4103D may be formed in the z-axis positive direction from the infrared ray detection unit 410 that is positioned so as to be opposed to the I/O device 900 in the z-axis direction.

In this case, the virtual image display region 2203D outputted by the I/O device 900 is generated as a space region common to the three-dimensional space detection region 4103D.

Moreover, as illustrated in FIG. 10, the virtual image display region 2203D may be outputted from the I/O device 900, and the three-dimensional space detection region 4103D of the infrared ray detection unit 410 may be formed in the same direction as that of the I/O device 900 (both in the z-axis positive direction with respect to the x-y plane).

Also in this case, the virtual image display region 2203D outputted by the I/O device 900 is generated as a space region common to the three-dimensional space detection region 4103D.

Then, as illustrated in FIG. 11, the virtual image display region 2203D may be outputted in the vertical upward direction (y-axis positive direction) from the I/O device 900. Also in FIG. 11, similarly to FIG. 9 and FIG. 10, the virtual image display region 2203D outputted by the I/O device 900 is generated as a space region common to the three-dimensional space detection region 4103D.

Moreover, although not illustrated, the I/O device 900 may be arranged on the upper side (y-axis positive direction side) of the three-dimensional space detection region 4103D, and the virtual image display region 2203D may be outputted in the vertical downward direction (y-axis negative direction). The virtual image display region 2203D may be outputted in the horizontal direction (x-axis direction). Like a projector or a movie theater, the virtual image display region 2203D may be outputted from the upper back side (the z-axis positive direction and the y-axis positive direction).

(Manipulation Region and Gesture Region)

Figure 12:
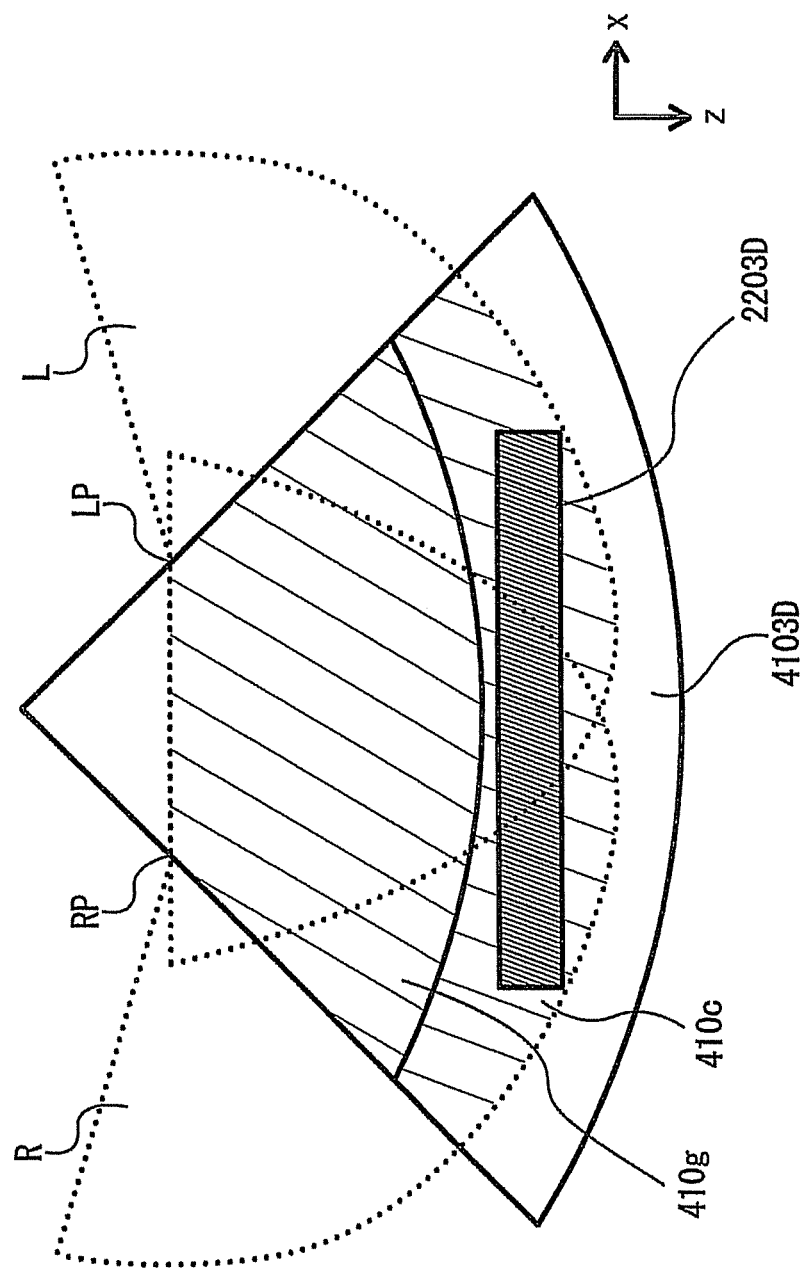
FIG. 12 is a schematic diagram illustrating an example of a manipulation region and a gesture region in the detection region.
Figure 13:
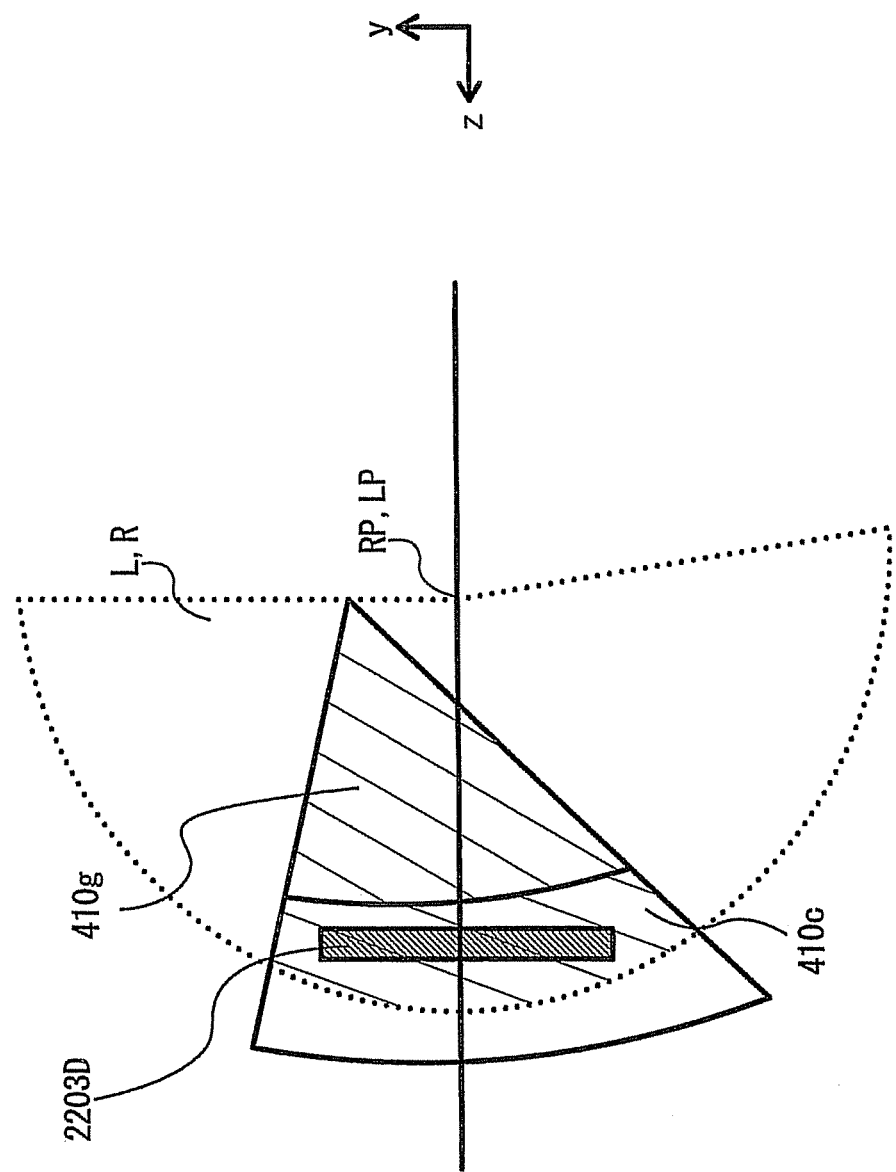
FIG. 13 is a schematic diagram illustrating an example of the manipulation region and the gesture region in the detection region.

Next, a manipulation region and a gesture region in the detection region are described. FIG. 12 and FIG. 13 are schematic diagrams illustrating an example of the manipulation region and the gesture region in the detection region.

First, as illustrated in FIG. 12, in general, the user horizontally moves both his/her hands about both his/her shoulder joints (a right shoulder joint RP and a left shoulder joint LP) as the respective centers of rotation, and hence both his/her hands can respectively move within a movement region L and a movement region R surrounded by dotted lines.

Moreover, as illustrated in FIG. 13, in general, the user vertically moves both his/her hands about both his/her shoulder joints (the right shoulder joint RP and the left shoulder joint LP) as the respective centers of rotation, and hence both his/her hands can respectively move within the movement region L and the movement region R surrounded by dotted lines.

That is, as illustrated in FIG. 12 and FIG. 13, the user can move both his/her hands about the right shoulder joint RP and the left shoulder joint LP as the respective centers of rotation, in a three-dimensional space having an imperfect spherical shape (having an arch-like curved surface that is convex in the depth level direction).

Then, an overlapping space region of all of: the three-dimensional space detection region 4103D of the infrared ray detection unit 410; a region in which a virtual image display region can exist (in FIG. 12, the virtual image display region 2203D is illustrated as an example); and a region obtained by integrating the arm movement region L and the arm movement region R is set as a manipulation region 410c.

Moreover, a portion other than the manipulation region 410c in the three-dimensional space detection region 4103D is set as a gesture region 410g, the portion overlapping with the region obtained by integrating the arm movement region L and the arm movement region R.

Here, the manipulation region 410c has a stereoscopic shape whose farthest surface in the depth level direction is an arch-like curved surface that is convex in the depth level direction (z-axis positive direction), whereas the virtual image display region 2203D has a stereoscopic shape whose farthest surface in the depth level direction is a planar surface. Due to such a difference in the shape of the farthest surface between the two regions, the user physically feels a sense of discomfort during the manipulation. In order to solve the sense of discomfort, adjustment is performed in a calibration process. Moreover, the details of the calibration process are described below.

(Description of Calibration)

Figure 14:
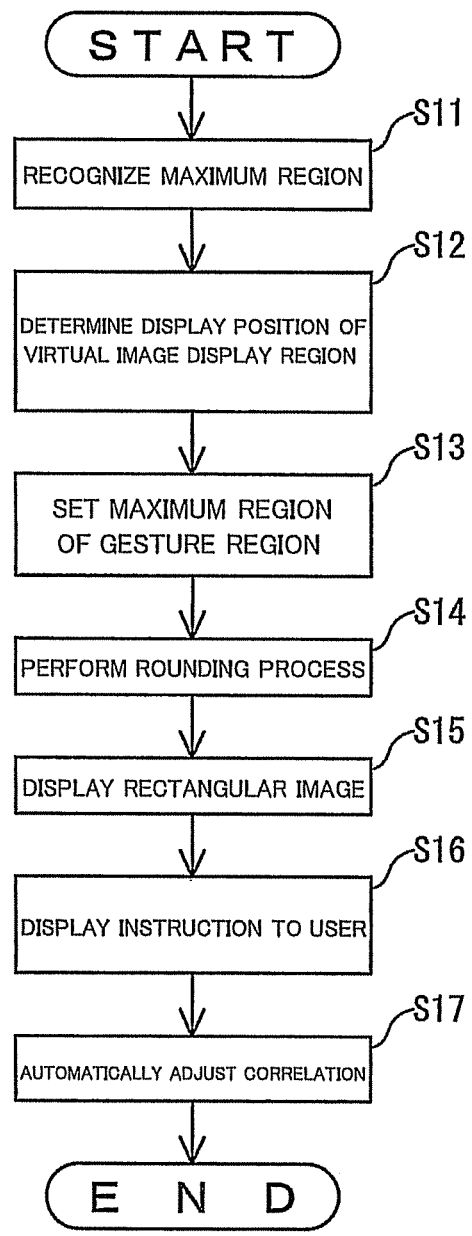
FIG. 14 is a flowchart for describing a calibration process.

Next, the calibration process is described. FIG. 14 is a flowchart for describing the calibration process.

As illustrated in FIG. 12 and FIG. 13, when the user tries to move his/her hand(s) along the virtual image display region 2203D, the user needs to move his/her hand(s) along a plane without any guide. Accordingly, the calibration process is performed to facilitate the manipulation in the virtual image display region 2203D through a reorganization process to be described below.

Moreover, in the calibration process, the finger length, the hand length, and the arm length, which are different for each user, are also adjusted.

Hereinafter, description is given with reference to FIG. 14. First, the glasses display device 100 is attached to the user, and the user maximally stretches both his/her arms. As a result, the infrared ray detection unit 410 recognizes the maximum region of the manipulation region 410c (Step S11).

That is, because the finger length, the hand length, and the arm length are different for each user, the manipulation region 410c is adjusted to suit each user.

Then, in the glasses display device 100, a display position of the virtual image display region 2203D is determined (Step S12). That is, if the virtual image display region 2203D is arranged outside of the manipulation region 410c, a user's manipulation becomes impossible, and hence the virtual image display region 2203D is arranged inside of the manipulation region 410c.

Subsequently, the maximum region of the gesture region 410g is set within the three-dimensional space detection region 4103D of the infrared ray detection unit 410 of the glasses display device 100 so as not to overlap with the display position of the virtual image display region 2203D (Step S13).

Note that it is preferable that the gesture region 410g be arranged so as not to overlap with the virtual image display region 2203D and be provided with a thickness in the depth direction (z-axis positive direction).

In the present embodiment, the manipulation region 410c, the virtual image display region 2203D, and the gesture region 410g are set in such a manner as described above.

Next, calibration of the virtual image display region 2203D in the manipulation region 410c is described.

In the case where it is determined that the finger(s), the hand(s), or the arm(s) of the user exist around the outside of the virtual image display region 2203D in the manipulation region 410c, such rounding as if the finger(s), the hand(s), or the arm(s) of the user existed inside of the virtual image display region 2203D is performed (Step S14).

As illustrated in FIG. 12 and FIG. 13, in a region near a central part of an image virtually displayed by the semi-transmissive displays 220, if the user maximally stretches both his/her arms, the tips of both his/her hands do not stay within the virtual image display region 2203D and go out thereof in the depth direction (z-axis positive direction). Meanwhile, in an end part of the virtually displayed image, unless the user maximally stretches both his/her arms, it is not determined that the tips of both his/her hands exist within the virtual image display region 2203D.

Hence, if a signal from the infrared ray detection unit 410 is used without being processed, even if the tips of his/her hands go out of the virtual image display region 2203D, the user has difficulty in physically feeling such a state.

Accordingly, in the process of Step S14 in the present embodiment, the signal from the infrared ray detection unit 410 is processed such that the tips of his/her hands that protrude to the outside of the virtual image display region 2203D are corrected to exist within the virtual image display region 2203D.

As a result, in the state where the user maximally stretches or slightly bends both his/her arms, a manipulation from the central part to the end part in the planar virtual image display region 2203D with a depth is possible.

Note that, although the virtual image display region 2203D is formed by a three-dimensional space region whose farthest surface in the depth level direction is a planar surface in the present embodiment, not limited thereto, the virtual image display region 2203D may be formed by a three-dimensional space region that is a curved surface having a shape along the farthest surfaces in the depth level direction of the farthest surface regions L and R in the depth level direction. As a result, in the state where the user maximally stretches or slightly bends both his/her arms, a manipulation from the central part to the end part in the planar virtual image display region 2203D with a depth is possible.

Further, the semi-transmissive displays 220 display a rectangular image in the virtual image display region 2203D. For example, as illustrated in FIG. 5(b), the semi-transmissive displays 220 display a rectangular image (Step S15).

Subsequently, an instruction to the effect that "please surround the displayed image with your fingers" is displayed on the semi-transmissive displays 220 (Step S16). Here, a finger-shaped image may be softly displayed in the vicinity of the image, and a vocal instruction from the speaker may be given to the user instead of such display on the semi-transmissive displays 220.

According to the instruction, the user places his/her fingers on a portion of the image as illustrated in FIG. 5(d). Then, a correlation between the display region of the virtual image display region 2203D and the infrared ray detection unit 410 is automatically adjusted (Step S17).

Note that, in the above example, the user defines a rectangular with his/her fingers, and places the rectangular thus defined on the rectangular of the outer edge of the image. For this reason, the visual recognition size and position of the rectangular defined by his/her fingers is made coincident with the visual recognition size and position of the rectangular of the outer edge of the image. However, the method of defining a shape with fingers is not limited thereto, and may be other arbitrary methods such as a method of tracing the outer edge of the displayed image with a finger and a method of pointing to a plurality of points on the outer edge of the displayed image with a finger. Moreover, these methods may be applied to images having a plurality of sizes.

Note that, although only the case of the glasses display device 100 is taken in the above description of the calibration process, in the case of the I/O device 900, an image may be displayed in the process of Step S11, and a correlation between the displayed image and the infrared ray detection unit 410 may be adjusted in the process of Step S17.

(Finger, Palm, and Arm Recognition)

Figure 15:
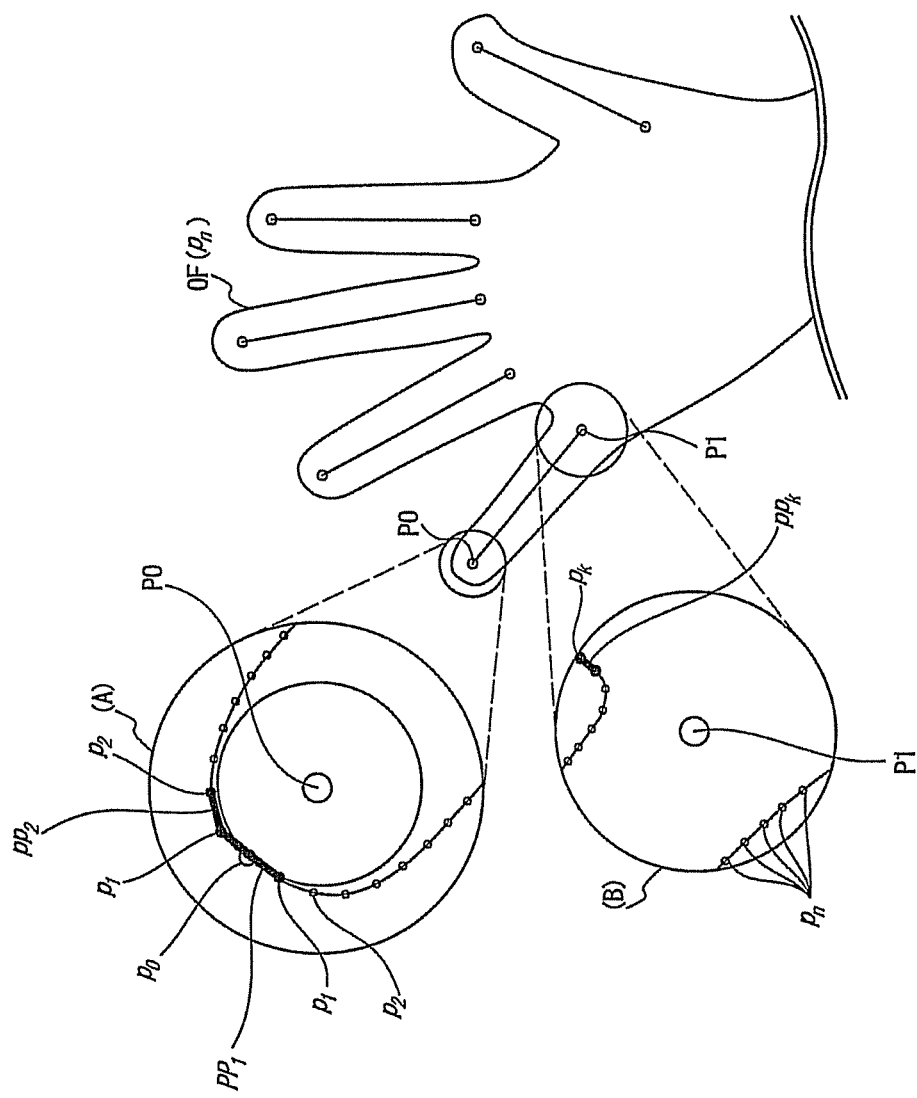
FIG. 15 is a schematic diagram illustrating an example of finger recognition.
Figure 16:
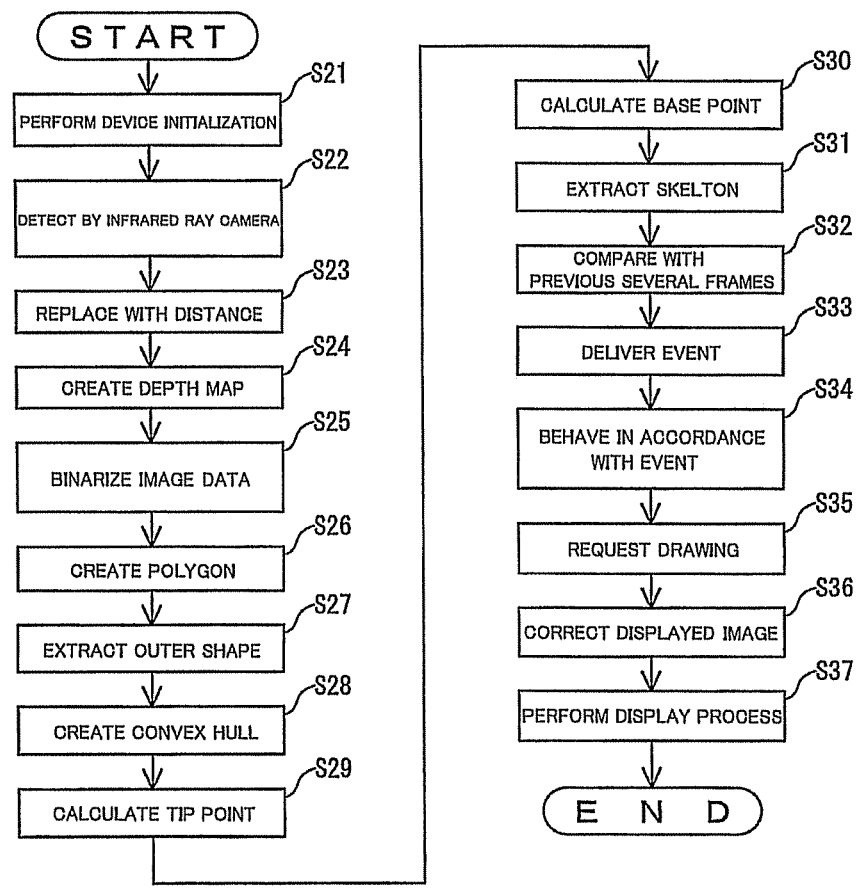
FIG. 16 is a flowchart illustrating an example of a finger recognition process.

Next, finger recognition is described, followed by description of palm recognition and arm recognition in the stated order. FIG. 15 is a schematic diagram illustrating an example of the finger recognition. In FIG. 15, (A) is an enlarged view of the vicinity of the tip of a finger, and (B) is an enlarged view of the vicinity of the base of the finger. FIG. 16 is a flowchart illustrating an example of the finger recognition process.

As illustrated in FIG. 16, in the present embodiment, device initialization is performed (Step S21). Then, an infrared ray that has been emitted from the infrared ray emission element 411 and has been reflected on a hand is detected by the infrared ray detection camera 412 (Step S22).

Then, image data is replaced with a distance on a pixel basis by the infrared ray detection unit 410 (Step S23). In this case, the luminance of the infrared ray is inversely proportional to the cube of the distance. A depth map is created using this fact (Step S24).

Subsequently, an appropriate threshold is set to the created depth map. Then, the image data is binarized (Step S25). That is, noise is removed from the depth map.

Subsequently, a polygon having about 100 vertexes is created from the binarized image data (Step S26). Then, a new polygon having a larger number of vertexes $p_n$ is created using a low-pass filter (LPF) such that the vertexes become smoother, whereby an outer shape OF of the hand illustrated in FIG. 15 is extracted (Step S27).

Note that, although the number of vertexes that are extracted from the data binarized in Step S26 in order to create a polygon is about 100 in the present embodiment, not limited thereto, the number of vertexes may be 1,000 or other arbitrary numbers.

A convex hull is extracted using Convex Hull from the set of the vertexes $p_n$ of the new polygon created in Step S27 (Step S28).

After that, a vertex $p_0$ common between the new polygon created in Step S27 and the convex hull created in Step S28 is extracted (Step S29). The common vertex $p_0$ itself thus extracted can be used as a tip point of the finger.

Further, another point calculated on the basis of the position of the vertex $p_0$ may be used as the tip point of the finger. For example, as illustrated in FIG. 15(A), the center of an inscribed circle of the outer shape OF at the vertex $p_0$ may also be calculated as a tip point P0.

Then, as illustrated in FIG. 15, a vector of a reference line segment $PP_1$ that passes through a pair of right and left vertexes $p_1$ adjacent to the vertex $p_0$ is calculated. After that, a side $pp_2$ connecting each vertex $p_1$ and a vertex $p_2$ adjacent thereto is selected, and a vector of the side $pp_2$ is calculated. Similarly, with the use of the vertexes $p_n$ forming the outer shape OF, such a process of obtaining a vector of each side is repeated along the outer periphery of the outer shape OF. The direction of each side and the direction of the reference line segment $PP_1$ calculated in the process of Step S30 are compared with each other, and a side $pp_k$ that is close to parallel to the reference line segment $PP_1$ is determined to exist at the position of a valley between fingers. Then, a base point P1 of the finger is calculated on the basis of the position of the side $pp_k$ (Step S30). A skeleton of the finger can be obtained by connecting the tip point P0 of the finger and the base point P1 of the finger using a straight line (Step S31). If the skeleton of the finger are obtained, the extending direction of the finger can be recognized.

A similar process is performed on all the fingers, whereby the skeletons of all the fingers are obtained. As a result, the pose of the hand can be recognized. That is, it can be recognized which of the thumb, the index finger, the middle finger, the ring finger, and the little finger is stretched and which thereof is bent.

Subsequently, a difference in the pose of the hand is detected in comparison with image data of several frames taken immediately before (Step S32). That is, movement of the hand can be recognized through the comparison with the image data of the several frames taken immediately before.

Subsequently, the recognized shape of the hand is event-delivered as gesture data to the event service unit 460 (Step S33).

Subsequently, a behavior according to the event is carried out by the application unit 459 (Step S34).

Subsequently, drawing in a three-dimensional space is requested by the view service unit 462 (Step S35).

The graphics processor unit 463 refers to the calibration data unit 457 using the calibration service unit 461, and corrects the displayed image (Step S36).

Lastly, the resultant image is displayed on the semi-transmissive displays 220 by the display processor unit 464 (Step S37).

Note that, although the base point of each finger is detected through the process of Step S30 and the process of Step S31 in the present embodiment, the method of detecting the base point is not limited thereto. For example, first, the length of the reference line segment $PP_1$ is calculated, the reference line segment $PP_1$ connecting the pair of vertexes $p_1$ that are adjacent to the vertex $p_0$ on one side and another side of the vertex $p_0$, respectively. Then, the length of a line segment connecting the pair of vertexes $p_2$ on the one side and the another side is calculated. Similarly, the length of each line segment connecting a pair of vertexes on the one side and the another side is calculated in order from vertexes positioned closer to the vertex $p_0$ to vertexes positioned farther therefrom. Such line segments do not intersect with one another inside of the outer shape OF, and are substantially parallel to one another. In the case where the vertexes at both the ends of such a line segment are in the portion of the finger, the length of the line segment corresponds to the width of the finger, and hence the amount of change thereof is small. Meanwhile, in the case where at least any of the vertexes at both the ends of such a line segment reaches the portion of the valley between the fingers, the amount of change of the length becomes larger. Accordingly, a line segment that has the length whose amount of change does not exceed a predetermined amount and is the farthest from the vertex $p_0$ is detected, and one point on the detected line segment is extracted, whereby the base point can be determined.

(Palm Recognition)

Figure 17:
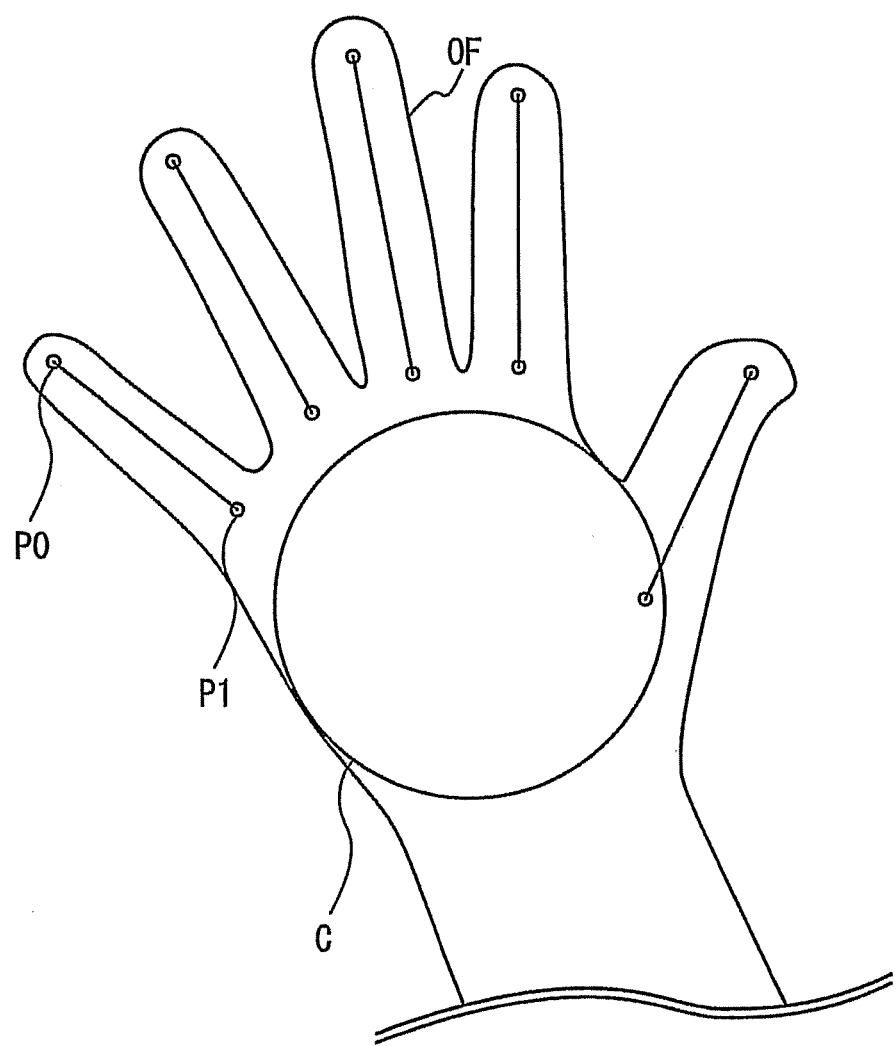
FIG. 17 is a schematic diagram illustrating an example of palm recognition.

Next, FIG. 17 is a schematic diagram illustrating an example of the palm recognition.

As illustrated in FIG. 17, after the finger recognition is carried out, a maximum inscribed circle C inscribed in the outer shape OF of the image data is extracted. The position of the maximum inscribed circle C can be recognized as the position of the palm.

Figure 18:
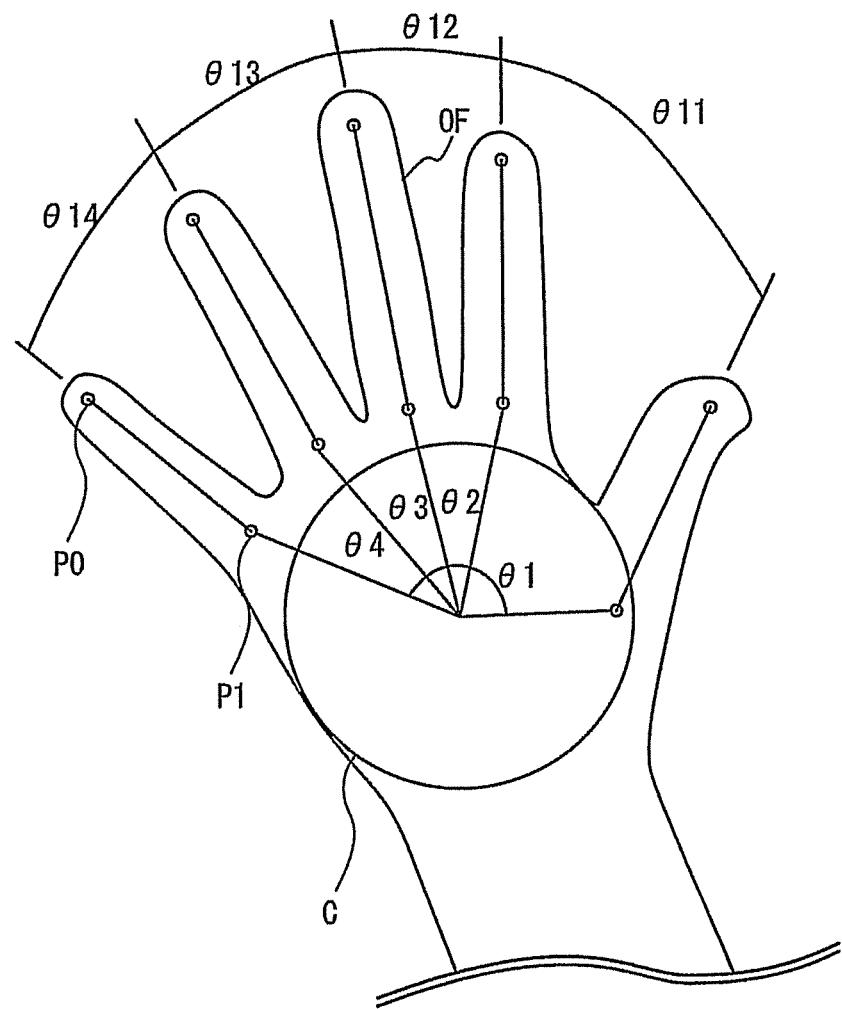
FIG. 18 is a schematic diagram illustrating an example of thumb recognition.

Next, FIG. 18 is a schematic diagram illustrating an example of thumb recognition.

As illustrated in FIG. 18, the thumb has features different from those of the other four fingers of the index finger, the middle finger, the ring finger, and the little finger. For example, among angles θ1, θ2, θ3, and θ4 mutually formed by straight lines connecting: the center of the maximum inscribed circle C indicating the position of the palm; and the respective base points P1 of the fingers, θ1 concerning the thumb tends to be the largest. Moreover, among angles θ11, θ12, θ13, and θ14 mutually formed by straight lines connecting: the respective tip points P0 of the fingers; and the respective base points P1 of the fingers, θ11 concerning the thumb tends to be the largest. The thumb is determined on the basis of such tendencies. As a result, it can be determined whether the image data is a right hand or a left hand or whether the image data is the front side or the back side of the palm.

(Arm Recognition)

Next, the arm recognition is described. In the present embodiment, the arm recognition is carried out after any of the fingers, the palm, and the thumb is recognized. Note that the arm recognition may also be carried out before any of the fingers, the palm, and the thumb is recognized or at the same time as at least any thereof is recognized.

In the present embodiment, a polygon is extracted from a region larger than the polygon of the shape of the hand of the image data. For example, the processes of Steps S21 to S27 are carried out in a length range of 5 cm or more and 100 cm or less and, more preferably, a length range of 10 cm or more and 40 cm or less, so that an outer shape is extracted.

After that, a quadrangular frame circumscribed around the extracted outer shape is selected. In the present embodiment, the shape of the quadrangular frame is a parallelogram or a rectangle.

In this case, because the parallelogram or the rectangle has longer sides opposed to each other, the extending direction of the arm can be recognized from the extending direction of the longer sides, and the direction of the arm can be determined from the direction of the longer sides. Note that, similarly to the process of Step S32, movement of the arm may be detected in comparison with image data of several frames taken immediately before.

Note that, although the fingers, the palm, the thumb, and the arm are detected from a two-dimensional image in the above description, not limited thereto, the infrared ray detection unit 410 may be further provided, or only the infrared ray detection camera 412 may be further provided, and a three-dimensional image may be recognized from two-dimensional images. As a result, the recognition accuracy can be further enhanced.

(View Example of Semi-transmissive Display)

Figure 19:
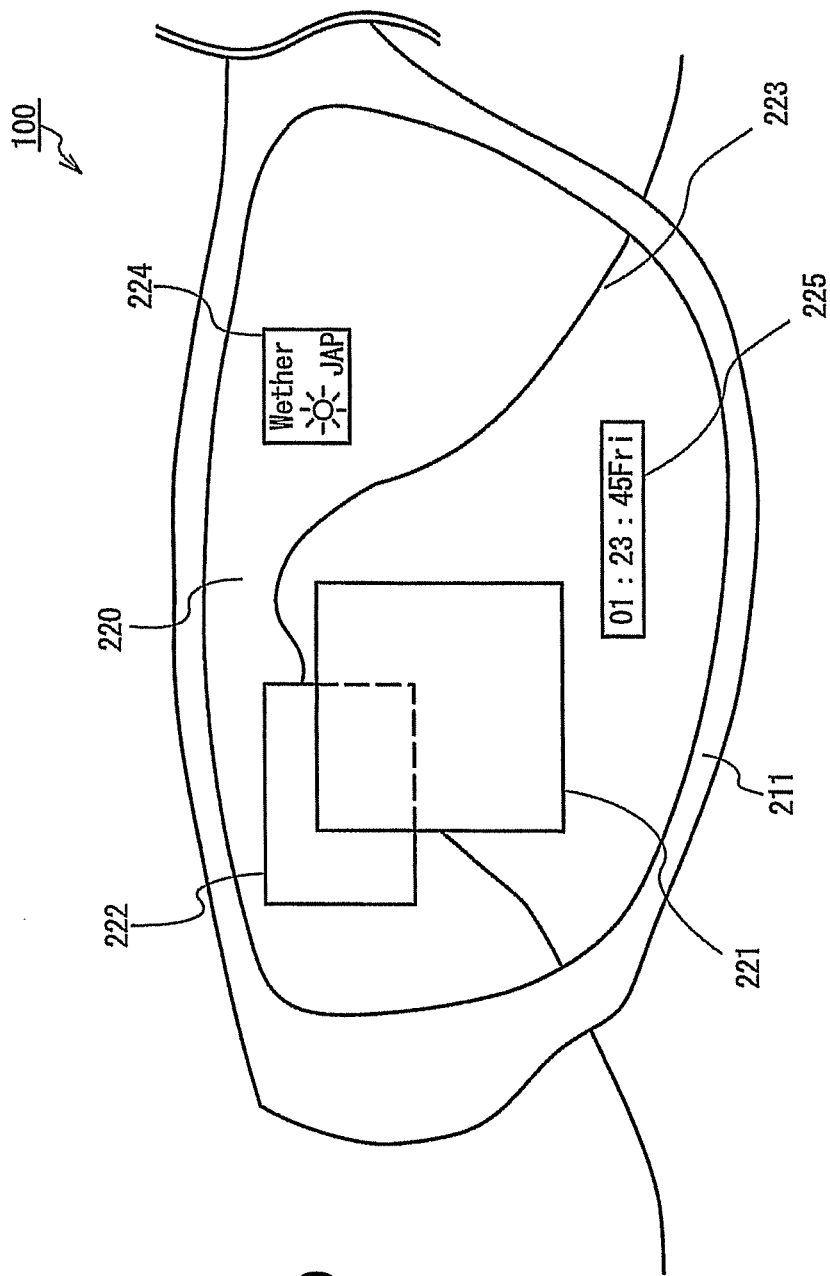
FIG. 19 is a schematic diagram illustrating an example of a view of the semi-transmissive display 220 of the glasses display device 100.

Next, FIG. 19 is a schematic diagram illustrating an example of a view of the semi-transmissive display 220 of the glasses display device 100.

As illustrated in FIG. 19, on the semi-transmissive display 220 of the glasses display device 100, an advertisement 221 is partially displayed, and a map 222 is further partially displayed. In addition, through the semi-transmissive display 220 of the glasses display device 100, scenery 223 is visually recognized. In addition, weather forecast 224 and time 225 are displayed thereon.

(Description of Field of View)

Next, an example of the view displayed on the semi-transmissive display 220 of the glasses display device 100 is described. FIG. 20(a) is a diagram for describing an example of the field of view of the semi-transmissive display 220, and FIG. 20(b) is a diagram for describing an example of the view of the semi-transparent display 220

Figure 20:
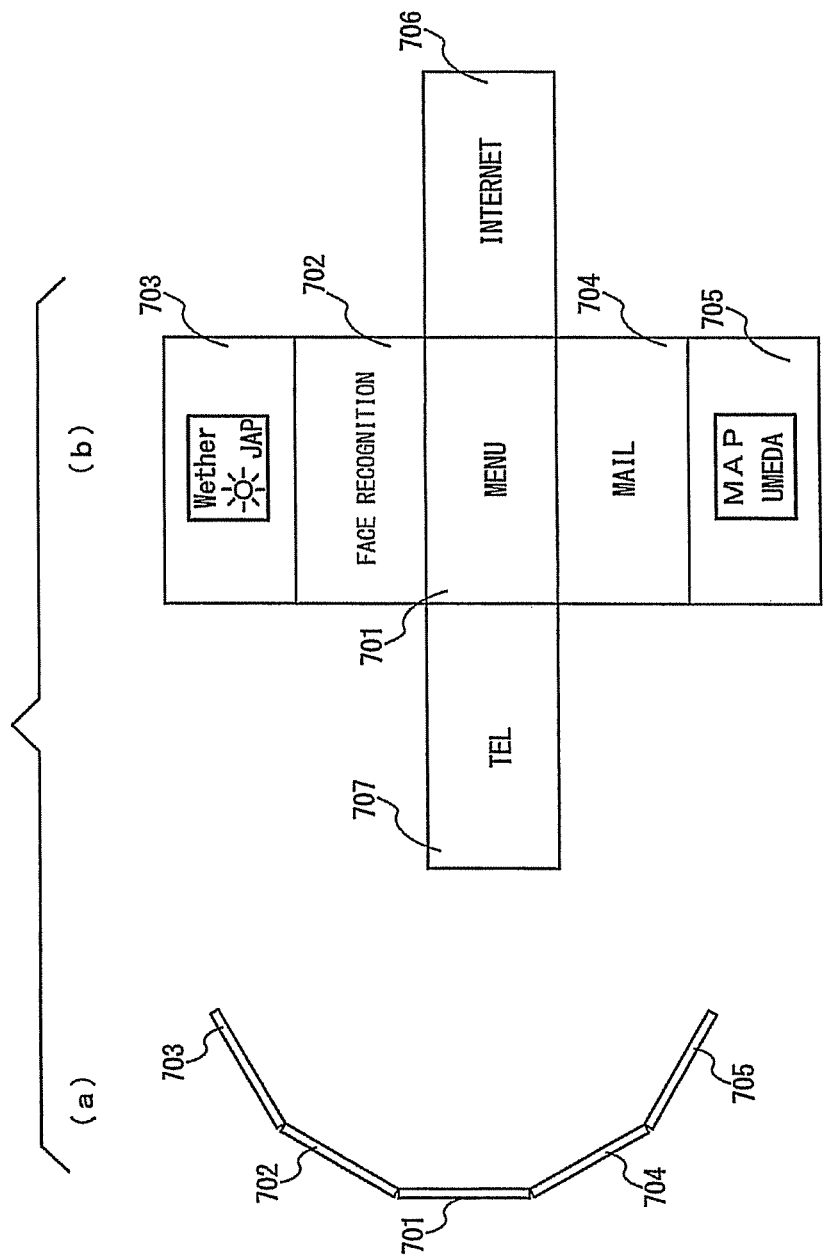
FIG. 20 is a schematic diagram illustrating an example (a) of a field of view of the semi-transmissive display 220 and an example (b) of the view of the semi-transparent display 220.

As illustrated in FIG. 20, in the present embodiment, the view that can be visually recognized on the glasses display device 100 includes a plurality of views 701 to 707. All the plurality of views are segments each constituting part of an integrated continuous image. Through smooth transition from one visually recognized portion to another visually recognized portion in the continuous image, the plurality of views are switchingly displayed without any discontinuity.

As illustrated in FIG. 20, the views 703, 702, 701, 704, and 705 are provided in the top-bottom direction, and the views 706 and 707 are respectively provided on the right side and the left side of the view 701. Note that, as a matter of course, the views 701 to 707 can be freely deleted or changed by the user, and other views can be further added by the user.

Note that, although the views 701 to 707 are a seamless continuous image in the present embodiment, the views to be switched may be discontinuous images independent of one another.

Specifically, in the case where the posture of the glasses display device 100 is in the horizontal direction, that is, in the case where the glasses display device 100 is attached to the user and where the user faces horizontally forward, the view 701 is displayed.

Subsequently, in the case where the glasses display device 100 is attached to the user and where the user faces obliquely upward at about 30 degrees with respect to a horizontal plane (that is, a plane parallel to the horizontal direction), the view 702 is displayed. That is, on the basis of a signal from at least one of the gyroscope unit 420 and the acceleration detection unit 430 in the glasses display device 100, which direction the user faces is recognized. Note that, for example, a screen of a face recognition application may be displayed as the view 702.

Further, in the case where the user faces obliquely upward at about 45 degrees with respect to the horizontal plane, the view 703 is displayed. Weather forecast may be displayed as the view 703. Moreover, other sky information may be displayed as the view 703, and, for example, a constellation image may also be displayed thereas depending on the time zone.

Similarly, in the case where the glasses display device 100 is attached to the user and where the user faces obliquely downward at about 30 degrees with respect to the horizontal plane, the view 704 (for example, an e-mail screen) is displayed. In the case where the user faces obliquely downward at about 45 degrees with respect to the horizontal plane, the view 705 (for example, a map) is displayed. In the case where the user faces rightward at about 30 degrees with respect to a vertical plane, the view 706 (for example, an Internet browser) is displayed. In the case where the user faces leftward at about 30 degrees with respect to the vertical plane, the view 707 (for example, a phone call screen) is displayed.

Moreover, although the switching among the view 701 to the view 707 is made on the basis of the signal from at least one of the gyroscope unit 420 and the acceleration detection unit 430 in the above description, not limited thereto, the switching thereamong may be made on the basis of the above-mentioned finger, palm, or arm recognition.

Further, when the user is walking, as a condition for making at least any of switches from the view 701 to the view 702, from the view 701 to the view 704, from the view 701 to the view 707, and from the view 701 to the view 706, the level of the signal from at least one of the gyroscope unit 420 and the acceleration detection unit 430 may be set to be higher. This can prevent switching from the view 701 to another view in a short time during the walk. Moreover, such setting that switching is not particularly made when the user suddenly turns around may be provided.

Meanwhile, the view 703 of sky information and the view 705 of map information may be panoramically displayed. In this case, the views 703 and 705 may be scrolled along with rightward and leftward movements.

(Event Generation)

Figure 21:
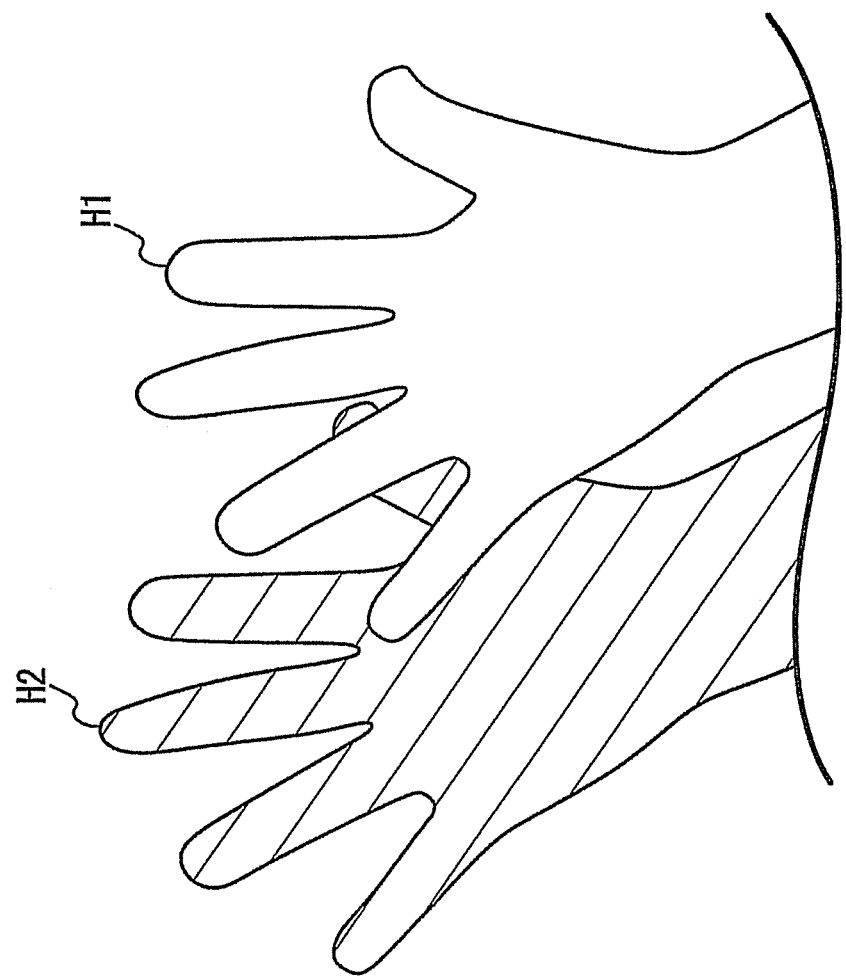
FIG. 21 is a schematic diagram illustrating an example of event generation.

Next, a predetermined event is generated in order to enable the user to easily recognize a difference between the case where the fingers, the palm, the hand, and the arm exist in the manipulation region 410c and the case where the fingers, the palm, the hand, and the arm exist in the gesture region 410g. Hereinafter, the predetermined event is described. FIG. 21 is a schematic diagram illustrating an example of the predetermined event generation, FIG. 22 is a schematic diagram illustrating another example of the event generation in FIG. 21, and FIG. 23 is a schematic diagram illustrating an example of another event generation.

First, as illustrated in FIG. 21, the shape of a hand H1 detected by the infrared ray detection unit 410 is displayed as a virtual image. Further, in the case where the user's hand is far from the manipulation region 410c, a shadow H2 having the shape of the hand H1 is displayed as an example of the event.

This enables the user to easily recognize that his/her hand exists in the gesture region 410g.

Figure 22:
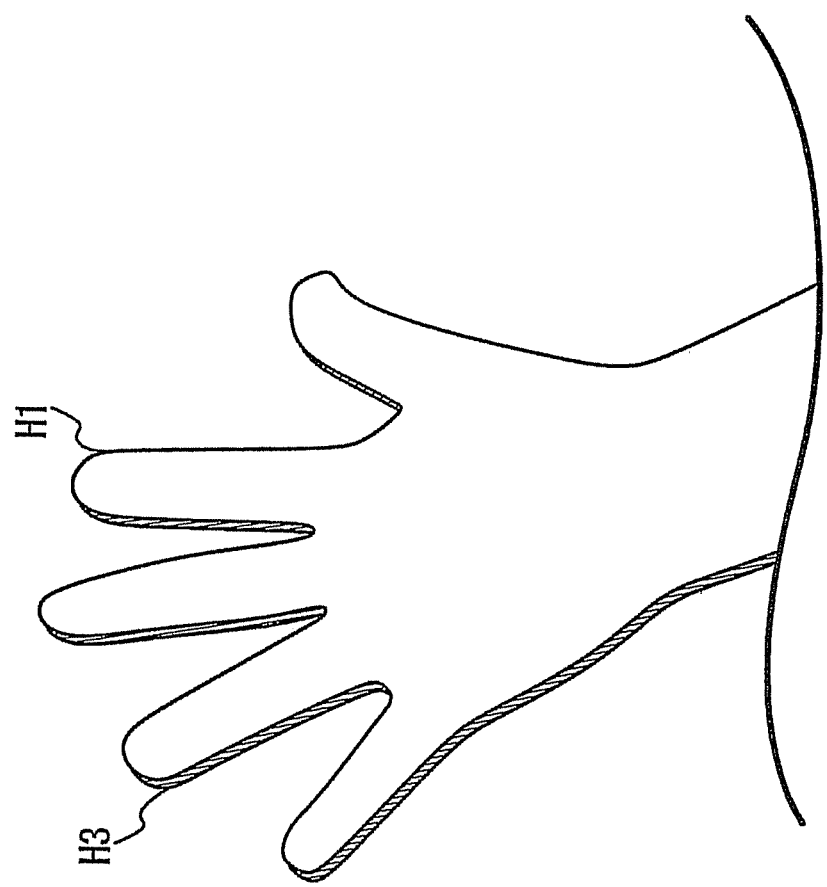
FIG. 22 is a schematic diagram illustrating another example of the event generation.
Figure 23:
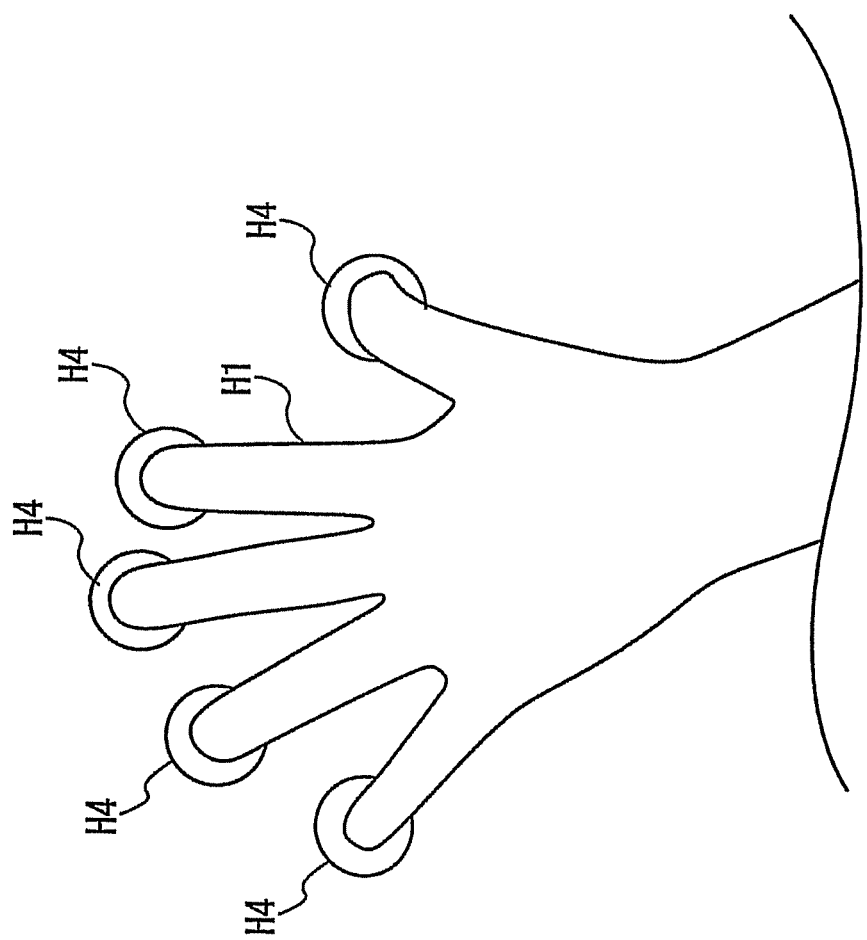
FIG. 23 is a schematic diagram illustrating another example of the event generation.

Subsequently, as illustrated in FIG. 22, the shape of the hand H1 detected by the infrared ray detection unit 410 is displayed as a virtual image, and a shadow H3 darker than the shadow H2 is displayed with a small area around the shape of the hand H1. Accordingly, the user can easily recognize that his/her hand more approaches the manipulation region 410c than the case of FIG. 21. Further, in the case where his/her hand exists in the manipulation region 410c, the shadows H2 and H3 are not displayed.

As a result, the user does not need to look for the manipulation region 410c through trial and error or gropingly. That is, the user can easily recognize the distance to the manipulation region 410c on the basis of the darkness of the shadow and the positional difference between the shape of the hand and the shadow.

Moreover, as illustrated in FIG. 23, in the case where the user's hand exists in the manipulation region 410c, circle views H4 may be respectively displayed on the finger tips.

Note that, although the event generation mode of displaying the shadows H2 and H3 and the circle views H4 is described above in the embodiment, not limited thereto, in the case where the user's hand exists in the manipulation region 410c, the displayed image may be rippled, the glasses display device 100 may be provided with a vibration generation device to generate vibrations, a sound may be generated, and the displayed image may be changed by at least any of blinking the displayed image and changing the lighting luminance. For example, the distance to the manipulation region 410c may be represented by the blinking interval, and the distance to the manipulation region 410c may be represented by the lighting luminance. For example, the blinking interval becomes longer with the increasing distance from the manipulation region 410c, and the blinking interval becomes shorter with the decreasing distance therefrom. Alternatively, the lighting luminance becomes lower with the increasing distance from the manipulation region 410c, and the lighting luminance becomes higher with the decreasing distance therefrom. Alternatively, the displayed image is lighted with a darker color (such as red, black, and purple) with the increasing distance from the manipulation region 410c, and the displayed image is lighted with a paler color (such as blue, yellow, and pink) with the decreasing distance therefrom. In this way, an arbitrary event that appeals to human senses (typified by a sense of sight, a sense of hearing, and a sense of touch) may be generated.

(Manipulation on Glasses Display Device)

A usage mode of the glasses display device 100 along with the above-mentioned finger, palm, and arm recognition and the above-mentioned event generation is described.

First, if the user places his/her hand in the manipulation region 410c, his/her hand is recognized, and the user can manipulate a virtual image view. For example, the user can enlarge or reduce the virtual image view, scroll the view, or select a point.

Figure 24:
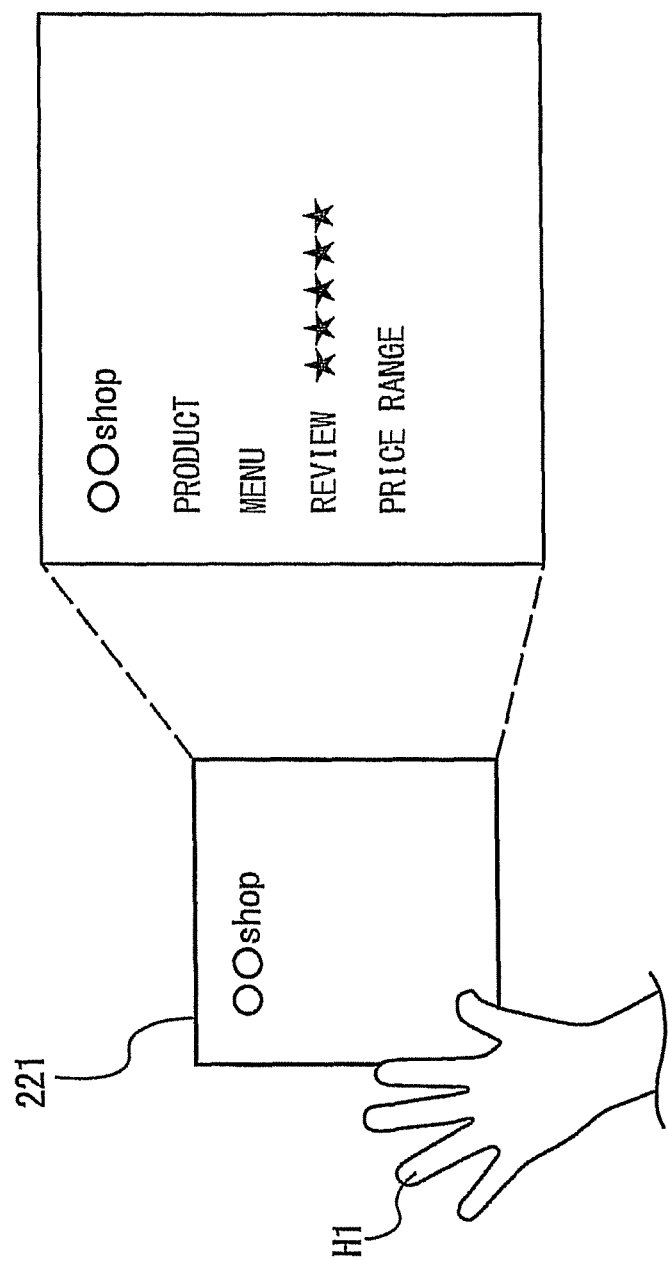
FIG. 24 is a schematic diagram illustrating an example of a manipulation on the glasses display device.

For example, as illustrated in FIG. 24, in the case where the user touches the view of the advertisement 221, an additional view may be displayed.

For example, information on products, services, and the like of a shop is displayed as the advertisement 221. In the case where the user touches the advertisement 221, further detailed information concerning the shop may be additionally displayed. For example, in the case where the shop is a restaurant, a main menu, user's reviews, a price range, and the like of the restaurant may be displayed.

Note that the advertisement 221 may be an image itself obtained by taking the shop by the camera unit 303, and may be recognition result information that is displayed on a shop recognition application screen as a result of automatically starting shop recognition on the basis of the image data of the shop taken by the camera unit 303.

(Display Based on Parody Mode)

Figure 25:
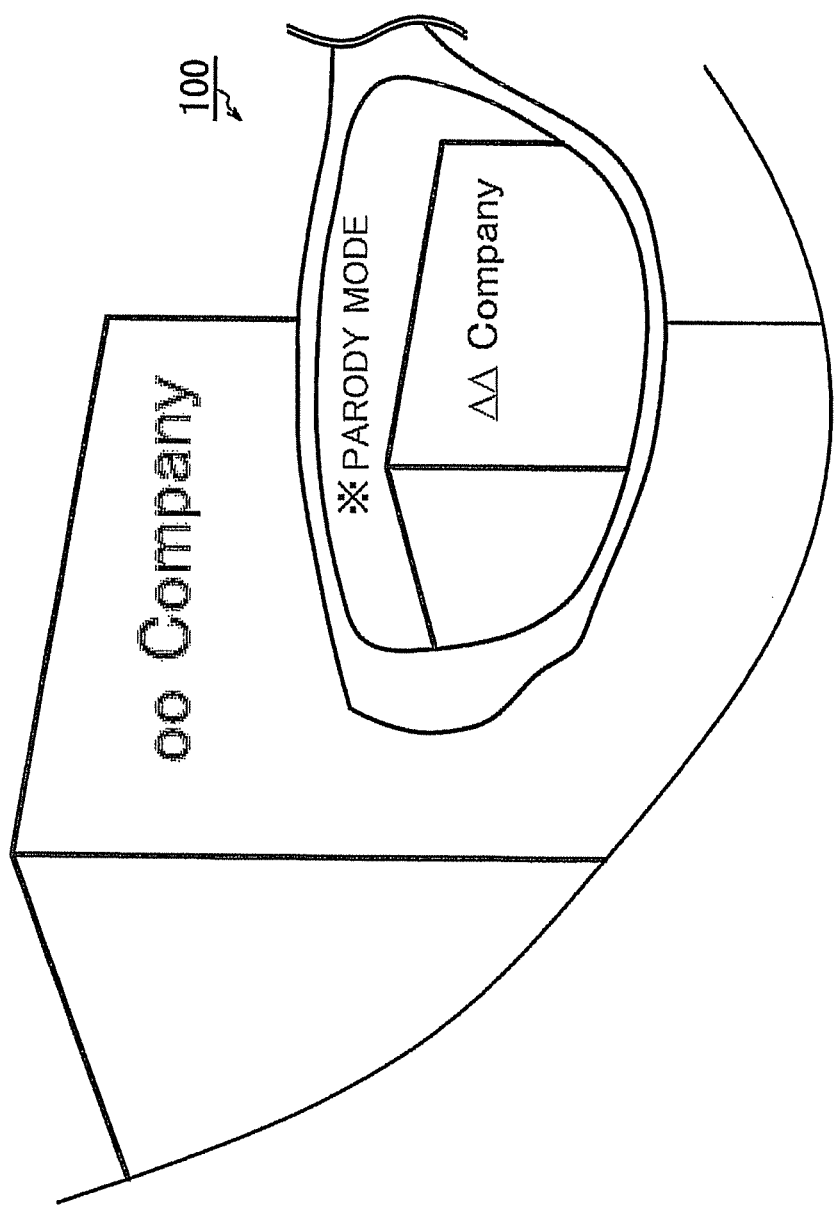
FIG. 25 is a schematic diagram illustrating another example of the manipulation on the glasses display device.

Moreover, as illustrated in FIG. 25, when a logo of one company (oo Company) is displayed on the semi-transmissive display 220, if the user touches the logo on the screen, information concerning another competitive or non-competitive company (ΔΔ Company) can be displayed. In this case, for example, a logo of the another company may be displayed as a parody mode.

(Display Based on Gesture Recognition)

Moreover, if the user makes a predetermined hand pose within the gesture region 410g, a preset operation is carried out. FIG. 26 to FIG. 33 are schematic diagrams each illustrating an example of the gesture recognition.

Figure 26:
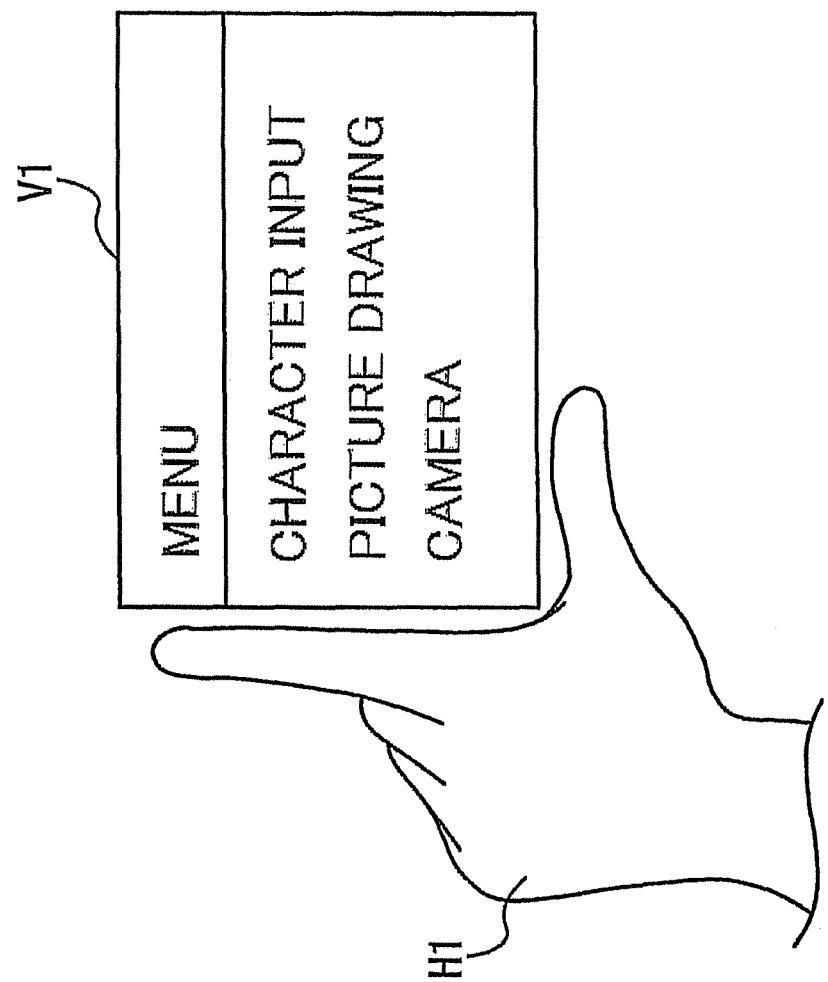
FIG. 26 is a schematic diagram illustrating an example of gesture recognition.

For example, as illustrated in FIG. 26, in the case where the user opens and stretches the thumb and the index finger of the closed hand H1 at 90 degrees to make an L-shaped sign, a menu screen V1 may be displayed between the thumb and the index finger.

Figure 27:
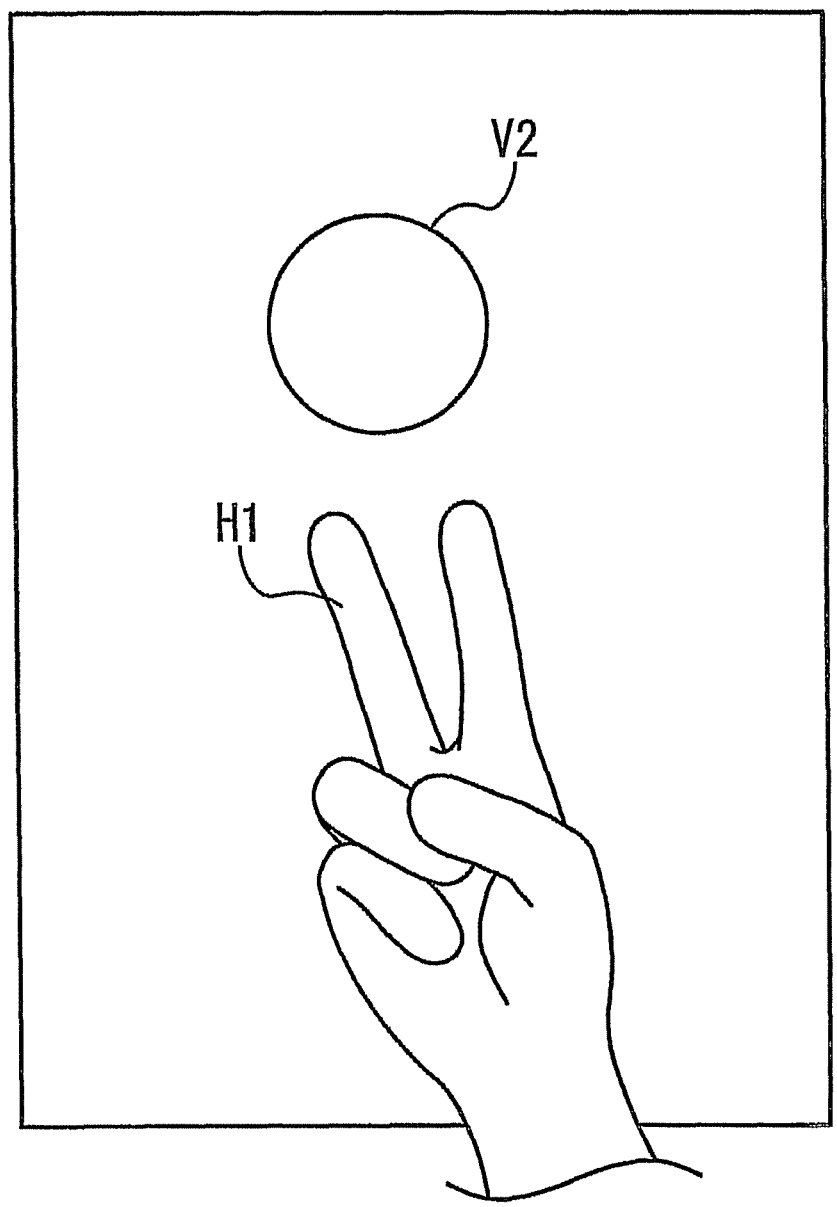
FIG. 27 is a schematic diagram illustrating another example of the gesture recognition.

Moreover, as illustrated in FIG. 27, in the case where the user opens and stretches the index finger and the middle finger of the closed hand H1 to make a so-called peace sign, a predetermined image V2 may be displayed between the index finger and the middle finger.

Figure 28:
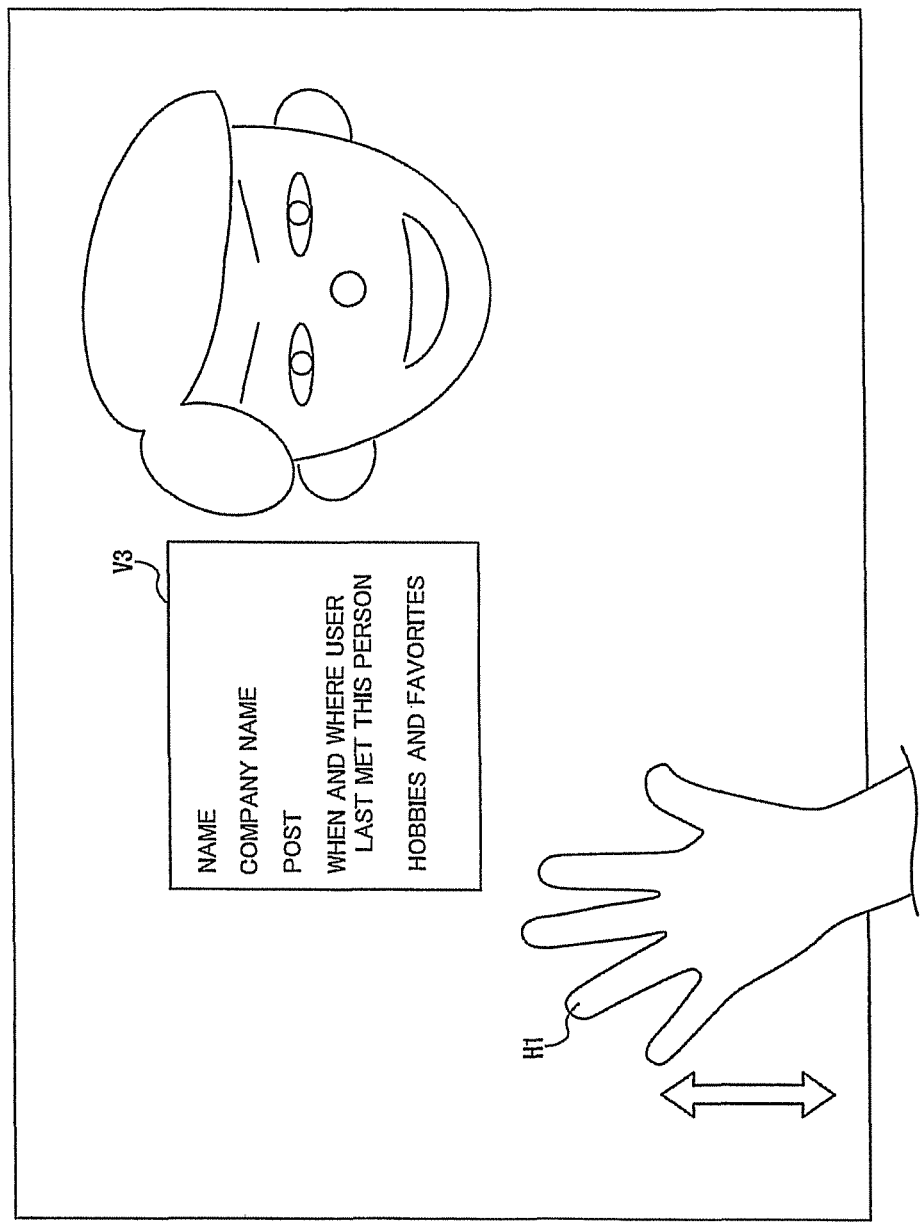
FIG. 28 is a schematic diagram illustrating another example of the gesture recognition.

Moreover, as illustrated in FIG. 28, in the case where the user makes a greeting action by moving the loosely opened hand H1 in an arrow direction, a face recognition application is automatically activated. On the basis of face data acquired by the camera unit 303, of a person whom the user gives the greeting, the face recognition is automatically started, and information on the name, the company name, the post, when and where the user last met this person, and the like is displayed on a face recognition application screen V3. Further, a flag is set each time the user meets the same person based on the recognition of the face recognition application, and the number of flags may be displayed on the face recognition application screen V3. In this case, the background, color, and the like of the face recognition application screen V3 may be changed depending on the number of flags.

Figure 29:
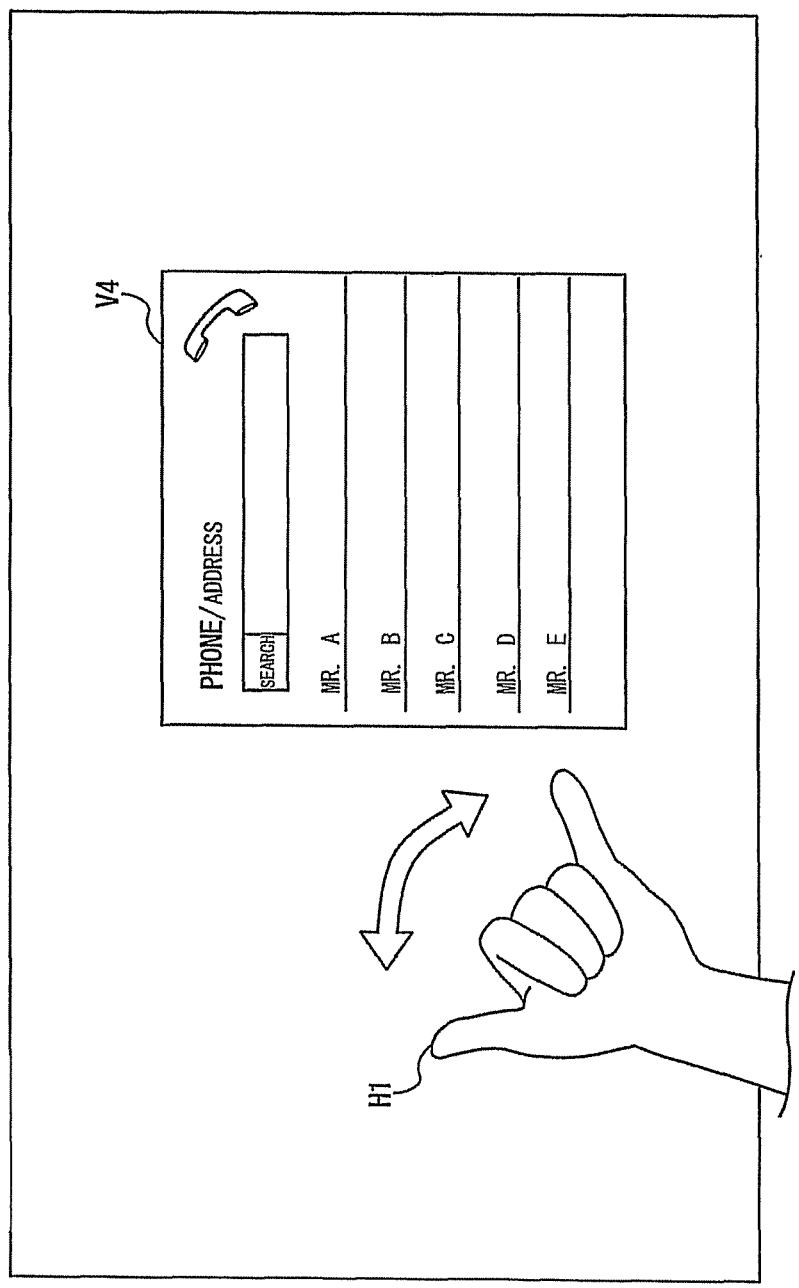
FIG. 29 is a schematic diagram illustrating another example of the gesture recognition.

Further, as illustrated in FIG. 29, in the case where the user opens the thumb and the little finger of the closed hand H1 to make a so-called aloha sign and waves the sign in the arrow directions, a phone application is automatically activated, and address book data V4 is displayed. The user can make a phone call to a predetermined person by manipulating the phone application.

Figure 30:
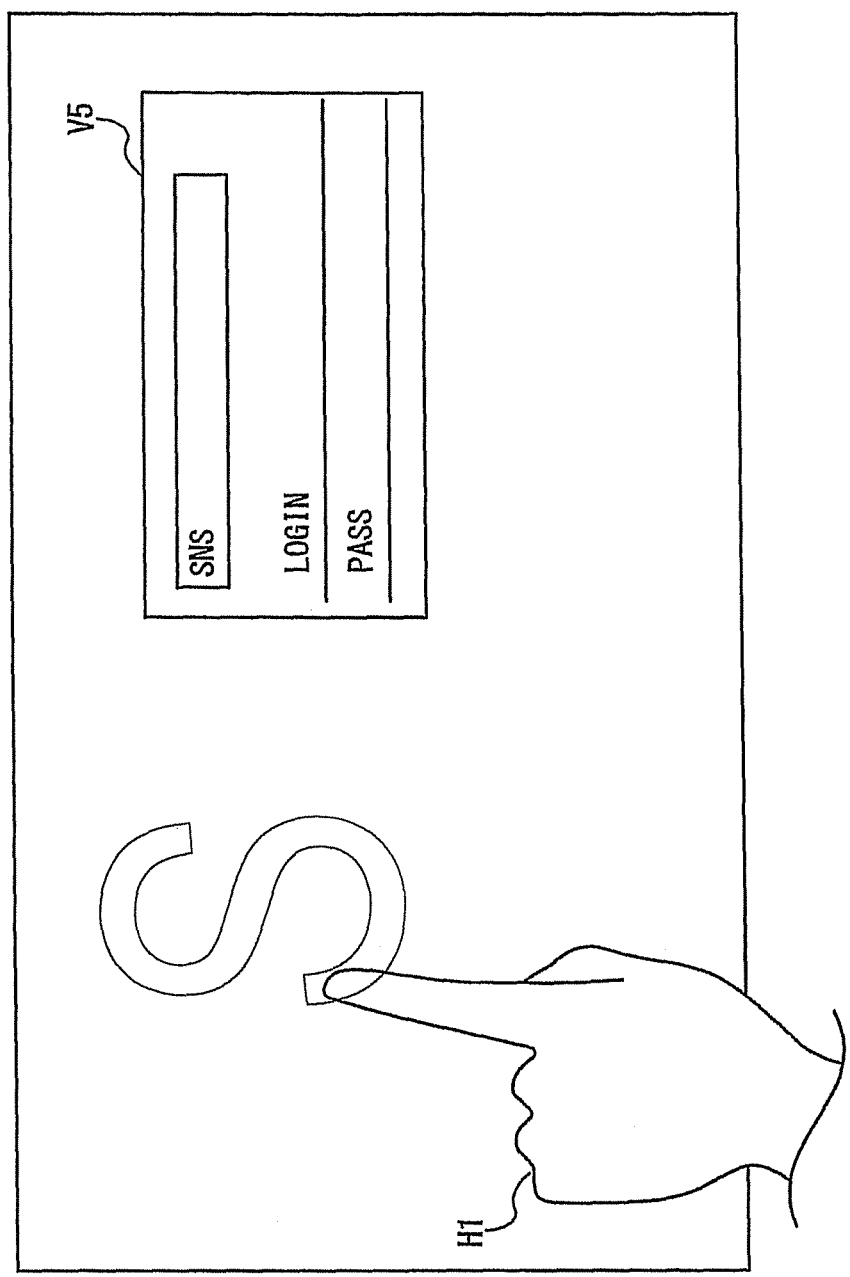
FIG. 30 is a schematic diagram illustrating another example of the gesture recognition.

Moreover, as illustrated in FIG. 30, in the case where the user draws an alphabetical letter S with a finger of the hand H1, a social networking service (SNS) application is automatically activated, and a SNS application screen V5 can be displayed.

Figure 31:
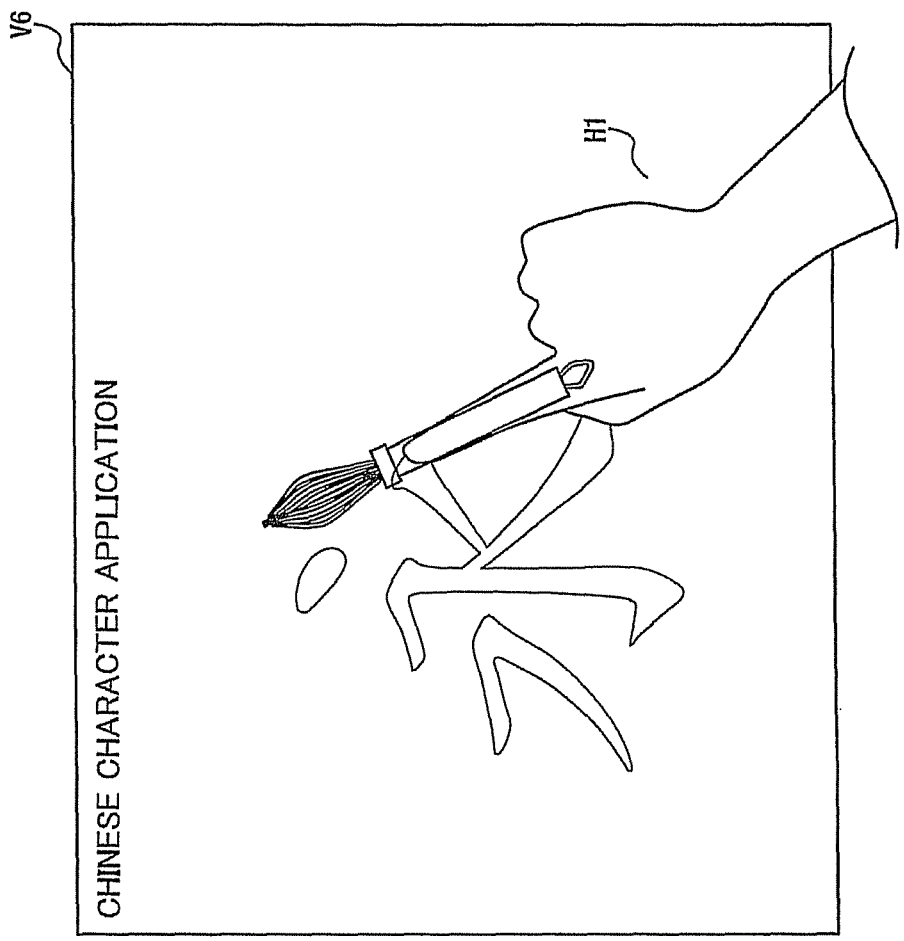
FIG. 31 is a schematic diagram illustrating another example of the gesture recognition.

Further, as illustrated in FIG. 31, in the case where the user activates a Chinese character application and causes the application to recognize the index finger of the hand H1, an image of an ink brush is further additionally displayed at the position of the index finger, and the user can practice writing Chinese characters on a Chinese character practice application screen V6.

Figure 32:
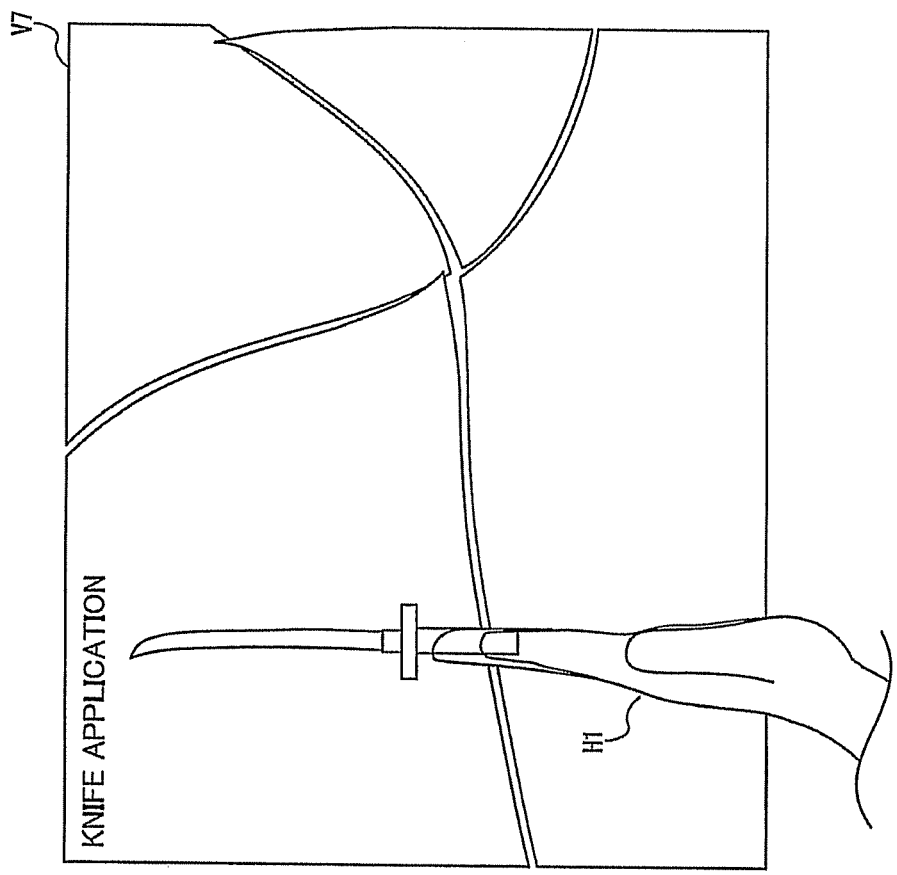
FIG. 32 is a schematic diagram illustrating another example of the gesture recognition.

Moreover, as illustrated in FIG. 32, in the case where the user makes the hand H1 into a hand-knife shape, a knife application is activated, an image of a knife is further additionally displayed at the position of the knife-shaped hand, and the user can cut a virtual image display screen V7.

Figure 33:
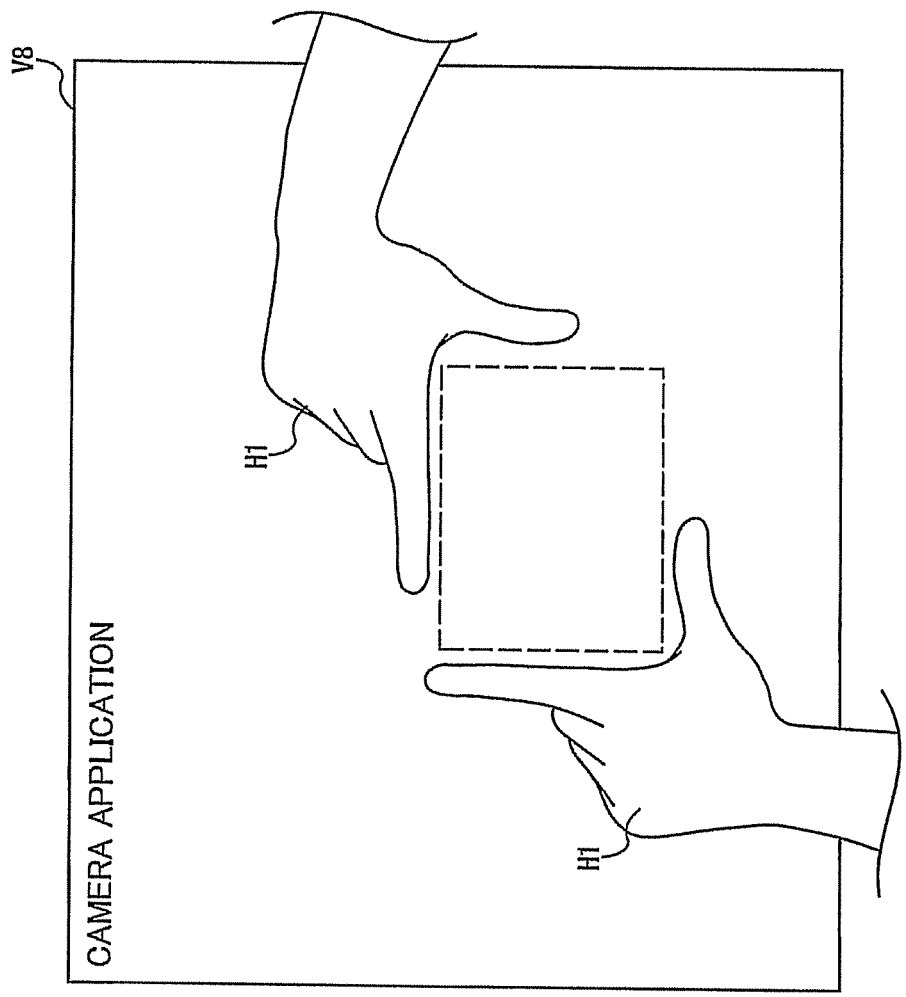
FIG. 33 is a schematic diagram illustrating another example of the gesture recognition.

Moreover, as illustrated in FIG. 33, in the case where the user forms a quadrangle with fingers of both the hands H1, a camera application is automatically activated, and an image of scenery or the like within an image taking frame extracted from the formed quadrangle may be taken on a camera application screen V8.

As described above, according to the shape recognition device of the present invention, not only the first extracting unit but also the second extracting unit can extract not only the vertex $p_0$ or the tip point P0, which is a point indicating the feature of the tip of the finger, but also the base point P1, which is a point indicating the feature of the base of the finger. As a result, the number of the feature points increases so that more precise information for recognizing the external shape OF of the hand H1 can be obtained.

According to the shape recognition device of the present invention, the first extracting unit can generate the external shape OF that is the polygon having the plurality of vertexes $p_n$ as the external-shape points based on the external shape detected by the infrared ray detection unit 410, and extract one point $p_0$ as a point indicating the feature of the tip of the finger from the vertexes $p_n$ of the external shape OF, and furthermore, the second extracting unit can calculate the direction of the reference line segment $PP_1$ connecting a pair of the vertexes $p_1$ that are disposed at both sides of the vertex $p_0$, which is the point indicating the feature of the tip of the finger, calculate the directions of the sides constituting the external shape OF in order from the vertex $p_n$ along the outer circumference of the external shape OF, and when the side $pp_k$ of the external shape OF that is most nearly parallel to the direction of the reference line segment $PP_1$ is detected, the second extracting unit can extract a point based on a position of the detected side $pp_k$ as the point indicating the feature of the base of the finger. Thus, a position of part having a feature of the external shape of the hand H1 can be easily known.

According to the shape recognition device of the present invention, the first extracting unit can detect the plurality of the vertexes $p_n$ as external-shape points at predetermined intervals along the external shape detected by the infrared ray detection unit 410 and extract one point $p_0$ from the vertexes $p_n$ as a point indicating the feature of the tip of the finger, and the second extracting unit can calculate the length of the line segment $pp_2$ connecting a pair of vertexes (for example, $p_2$) one of which is selected from the plurality of the vertexes $p_n$ at one side of the vertex $p_0$ and the other of which is selected from the plurality of the vertexes $p_n$ at the other side of the vertex $p_0$, in order from a position nearer to the vertex $p_0$ to a farther position, detect a line segment that has a length a change amount of which is smaller than a predetermined amount and is farthest from the first feature point and extract a point on the detected line segment as the point indicating the feature of the base of the finger. Thus, a position of part having a feature of the external shape of the hand H1 can be easily known.

According to the shape recognition device of the present invention, the object is the hand H1 so that an anatomic feature of a finger, a palm, a hand or an arm of a human body can be easily recognized.

According to the shape recognition device of the present invention, the extending-direction detecting unit can determine that a direction of a line segment connecting the point indicating the feature of the tip of the finger (the vertex $p_0$ or the tip point P0) and the point indicating the feature of the base of the finger (the base point P1) is an extending direction of the finger. In other words, the finger of the hand having a complicated shape can be easily recognized.

According to the shape recognition device of the present invention, the palm recognition unit recognizes the palm part based on the maximum inscribed circle C of the polygon as the external shape OF so that the palm can be easily and reliably recognized.

According to the shape recognition device of the present invention, the gesture recognition unit 456 can easily identify a pose of the hand that can have a complicated shape.

According to the shape recognition device of the present invention, the infrared ray detection unit 410 is used so that the external shape of the hand H1 can be precisely detected by infrared rays.

According to the shape recognition device of the present invention, the shape recognition device includes the semi-transmissive display 220 that can display a stereoscopic image, the infrared ray detection unit 410 includes a depth level sensor measuring a distance to the hand H1, and the infrared ray detection unit 410 can detect the external shape of the hand H1 at least either in the three-dimensional space detection region 4103D of the depth level sensor or in the common region that is shared by the virtual image display region 2203D of the stereoscopic image generated by the semi-transmissive display 220 and the three-dimensional space detection region 4103D so that visual recognition of the stereoscopic image in the common region and shape identification of the hand H1 existing in a visual field of the stereoscopic image can be simultaneously performed. In other words, while the stereoscopic image is displayed, shape recognition of the hand H1 can be performed.

The shape recognition device according to the present invention is embodied by the glasses display device 100 with the other components so that the shape recognition of the hand H1 can be performed with the shape recognition device attached to a body.

In the present invention, the control unit 450 corresponds to the "shape recognition device", the hand H1 and the fingers of the hand H1 correspond to the "object", the external shape OF corresponds to the "external shape detected by the external-shape detecting unit", the vertex $p_0$ corresponds to the "first feature point" and the "point of the tip", the base point P1 corresponds to the "second feature point" and the "point of the base", the vertexes $p_n$ correspond to the "plurality of the external-shape points", the vertex $p_1$ constitutes the "pair of the vertexes that are disposed at both sides of the first feature point", the reference line segment PP1 corresponds to the "line segment connecting a pair of the vertexes that are disposed at both sides of the first feature point", the sides $pp_2$ and $pp_k$ correspond to the "sides constituting the polygon", $pp_k$ corresponds to the "side of the polygon that has a direction most nearly parallel", the base point P1 corresponds to the "second feature point", the maximum inscribed circle C corresponds to the "maximum inscribed circle", the semi-transmissive display 220 corresponds to the "display device", the infrared ray detection unit 410 corresponds to the "depth level sensor", the virtual image display region 2203D corresponds to the "stereoscopic image", the three-dimensional space detection region 4103D corresponds to the "depth level detection region", the common region (which matches the virtual image display region 2203D) corresponds to the "common region", and the glasses display device 100 corresponds to the "head-mounted display device".

A preferred embodiment of the present invention has been described hereinabove, but the present invention is not limited to only the embodiment. It should be understood that various other embodiments are possible without departing from the spirit and scope of the present invention. Further, operations and effects produced by the configuration of the present invention are described in the present embodiment, but these operations and effects are given as examples, and are not intended to limit the present invention.

FIG. 4
S1 PERFORM DEPTH COMPUTING
S2 PROCESS TAKEN IMAGE DATA
S3 RECOGNIZE OUTER SHAPE
S4 RECOGNIZE GESTURE
S5 CARRY OUT EVENT
S6 VIRTUALLY DISPLAY IMAGE
FIG. 14
S11 RECOGNIZE MAXIMUM REGION
S12 DETERMINE DISPLAY POSITION OF VIRTUAL IMAGE DISPLAY REGION
S13 SET MAXIMUM REGION OF GESTURE REGION
S14 PERFORM ROUNDING PROCESS
S15 DISPLAY RECTANGULAR IMAGE
S16 DISPLAY INSTRUCTION TO USER
S17 AUTOMATICALLY ADJUST CORRELATION
FIG. 16
S21 PERFORM DEVICE INITIALIZATION
S22 DETECT BY INFRARED RAY CAMERA
S23 REPLACE WITH DISTANCE
S24 CREATE DEPTH MAP
S25 BINARIZE IMAGE DATA
S26 CREATE POLYGON
S27 EXTRACT OUTER SHAPE
S28 CREATE CONVEX HULL
S29 CALCULATE TIP POINT
S30 CALCULATE BASE POINT
S31 EXTRACT SKELTON
S32 COMPARE WITH PREVIOUS SEVERAL FRAMES
S33 DELIVER EVENT
S34 BEHAVE IN ACCORDANCE WITH EVENT
S35 REQUEST DRAWING
S36 CORRECT DISPLAYED IMAGE
S37 PERFORM DISPLAY PROCESS
FIG. 20
1 FACE RECOGNITION
FIG. 24
1 PRODUCT
2 MENU
3 REVIEW
4 PRICE RANGE
FIG. 25
1 oo Company
2 PARODY MODE
3 ∆∆ Company
FIG. 26
1 MENU
2 CHARACTER INPUT
3 PICTURE DRAWING
4 CAMERA
FIG. 28
1 NAME
2 COMPANY NAME
3 POST
4 WHEN AND WHERE USER LAST MET THIS PERSON
5 HOBBIES AND FAVORITES
FIG. 29
1 ADDRESS
2 SEARCH
3 MR. A
4 MR. B
5 MR. C
6 MR. D
7 MR. E
FIG. 31
1 CHINESE CHARACTER APPLICATION
FIG. 32
1 KNIFE APPLICATION
FIG. 33
1 CAMERA APPLICATION

The invention claimed is:

1. A shape recognition device comprising:
a depth level sensor that measures a distance to an object and detects an external shape of a hand of a human body according to measured distance; and
a control unit that comprises a memory and a processor and performs image recognition functions that recognize fingers of the hand, the image recognition functions comprising:
a polygon creation function that creates a polygon having a vertex at each of a plurality of external-shape points based on the external shape;
a tip point extraction function that extracts a tip point of each finger from common vertexes between the polygon and a convex hull of the polygon;
a vector calculation function that calculates a vector of a reference line segment that connects a pair of right and left vertexes of the polygon adjacent to the tip point and a vector of each side that constitutes the polygon;
a base point extraction function that extracts a base point of each finger based on a position of a side which is most parallel to the reference line segment; and
an extending-direction detecting function that extracts a skeleton of each finger by connecting the tip point and the base point of each finger, and calculates a direction of the skeleton.

2. The shape recognition device according to claim 1, wherein
the depth level sensor further detects an external shape of an arm of the human body, and
the image recognition functions further comprising:
a frame detecting function that detects a quadrangular frame circumscribed around the external shape of the arm; and
an extending-direction detecting function that calculates a direction of a longer side constituting the quadrangular frame.

3. The shape recognition device according to claim 1, the image recognition functions further comprising:
a palm recognition function that recognizes a position of a palm based on a maximum inscribed circle inscribed in the external shape of the hand.

4. The shape recognition device according to claim 3, the image recognition functions further comprising:
a thumb recognition function that recognizes a thumb of the hand based on the position of the palm and each finger recognized.

5. The shape recognition device according to claim 4, the control unit further performing:
an anatomy recognition function that recognizes an anatomic feature based on the fingers, the position of the palm and the thumb recognized; and
a gesture recognition function that recognizes a gesture based on the anatomic feature.

6. The shape recognition device according to claim 1, wherein the depth level sensor is an infrared camera.

7. The shape recognition device according to claim 1, further comprising a display device that can display a stereoscopic image.

8. A head-mounted display device comprising the shape recognition device according to claim 1.

9. A shape recognition system comprising:
a depth level sensor measures a distance to an object and detects an external shape of a hand having fingers of a human body according to measured distance;
a memory to store computer executable instructions; and
a processor to execute the computer executable instructions to perform processes, the processes comprising:
a polygon creation process of creating a polygon having a vertex at each of a plurality of external-shape points based on the external shape;
a tip point extraction process of extracting a tip point of each finger of the hand having fingers from common vertexes between the polygon and a convex hull of the polygon;
a vector calculation process of calculating a vector of a reference line segment that connects a pair of right and left vertexes of the polygon adjacent to the tip point and a vector of each side that constitutes the polygon;
a base point extraction process of extracting a base point of each finger based on a position of a side which is most parallel to the reference line segment; and
an extending-direction detecting process of extracting a skeleton of each finger by connecting the tip point and the base point of each finger, and calculating a direction of the skeleton.

10. The shape recognition system according to claim 9, further comprising a depth level sensor that detects an external shape of an arm of the human body, the processes further comprising:
a frame detecting process of detecting a quadrangular frame circumscribed around the external shape of the arm; and
an extending-direction detecting process of calculating a direction of a longer side constituting the quadrangular frame.

11. The shape recognition system according to claim 9, the processes further comprising:
a palm recognition process of recognizing a position of a palm based on a maximum inscribed circle inscribed in the external shape of the hand.

12. The shape recognition system according to claim 11, the processes further comprising:
a thumb recognition process of recognizing a thumb of the hand based on the position of the palm and each finger.

13. The shape recognition system according to claim 12, the processes further comprising:
an anatomy recognition process of recognizing an anatomic feature based on the fingers, the position of the palm and the recognized thumb; and
a gesture recognition process of recognizing a gesture based on the anatomic feature.

14. The shape recognition system according to claim 9, further comprising a display process capable of displaying a stereoscopic image.

15. A shape recognition method comprising:
a shape detecting step of detecting an external shape of a hand having fingers of a human body using data of distance to an object measured by a depth level sensor;
a polygon creation step of creating a polygon having a vertex at each of a plurality of external-shape points based on the external shape;
a tip point extraction step of extracting a tip point of each finger of the hand having fingers from common vertexes between the polygon and a convex hull of the polygon;
a vector calculation step of calculating a vector of a reference line segment that connects a pair of right and left vertexes of the polygon adjacent to the tip point and a vector of each side that constitutes the polygon;
a base point extraction step of extracting a base point of each finger based on a position of a side which is most parallel to the reference line segment; and
an extending-direction detecting step of extracting a skeleton of each finger by connecting the tip point and the base point of each finger, and calculating a direction of the skeleton.

16. The shape recognition method according to claim 15, further comprising
a shape detecting step of detecting an external shape of an arm of the human body using the depth level sensor;
a frame detecting step of detecting a quadrangular frame circumscribed around the external shape of the arm; and
an extending-direction detecting step of calculating a direction of a longer side constituting the quadrangular frame.

17. The shape recognition method according to claim 15, further comprising
a palm recognition step of recognizing a position of a palm based on a maximum inscribed circle inscribed in the external shape of the hand.

18. The shape recognition method according to claim 17, further comprising:
a thumb recognition step of recognizing a thumb of the hand based on the position of the palm and each finger.

19. The shape recognition method according to claim 18, further comprising:
an anatomy recognition step of recognizing an anatomic feature based on the fingers, the position of the palm and the recognized thumb; and
a gesture recognition step of recognizing a gesture based on the anatomic feature.

20. The shape recognition method according to claim 15, further comprising a display step of displaying a stereoscopic image.

* * * * *